US006425644B2

(12) United States Patent
Kawahata et al.

(10) Patent No.: US 6,425,644 B2
(45) Date of Patent: Jul. 30, 2002

(54) BRAKING PRESSURE CONTROL APPARATUS HAVING DEVICE FOR DIAGNOSING MANUALLY OPERATED HYDRAULIC SYSTEM

(75) Inventors: Fumiaki Kawahata; Tetsuya Miyazaki; Hirohiko Morikawa; Akihiro Otomo, all of Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/725,321

(22) Filed: Nov. 29, 2000

(30) Foreign Application Priority Data

Dec. 24, 1999 (JP) ............................................. 11-367990

(51) Int. Cl.[7] .............................................. B60T 8/88
(52) U.S. Cl. ................. 303/122; 303/113.3; 303/113.4; 303/122.09; 303/122.11; 303/122.13
(58) Field of Search .......................... 303/122, 122.03, 303/122.09, 122.1, 122.11, 122.13, 122.14, 157, 158, 113.3, 113.4, 115.2, 116.1, 20, DIG. 1, DIG. 2

(56) References Cited

U.S. PATENT DOCUMENTS

| | | | | |
|---|---|---|---|---|
| 4,817,767 A | * | 4/1989 | Seibert et al. | 303/116.1 |
| 4,834,469 A | * | 5/1989 | Kohno et al. | 303/116.1 |
| 5,295,737 A | * | 3/1994 | Epple et al. | 303/11 |
| 5,791,745 A | * | 8/1998 | Sakakibara | 303/11 |
| 6,076,897 A | * | 6/2000 | Binder et al. | 303/116.1 |
| 6,126,248 A | * | 10/2000 | Kawahata et al. | 303/116.1 |
| 6,158,825 A | * | 12/2000 | Schunck et al. | 303/11 |

FOREIGN PATENT DOCUMENTS

| | | |
|---|---|---|
| JP | 4-232153 | 8/1992 |
| JP | 4-243658 | 8/1992 |
| JP | 6-239221 | 8/1994 |
| JP | 8-506301 | 7/1996 |
| JP | 10-100884 | 4/1998 |

OTHER PUBLICATIONS

Jonner et al., *Electrohydraulic Brake System—The First Approach to Brake–By–Wire Technology*, SAE 960991, pp. 105–112, 1996.
SAE 960991 "Electrohydraulic Brake System—The First Approach to Brake–By–Wire Technology" (Robert Bosch GmbH) (date unknown).

\* cited by examiner

*Primary Examiner*—Pam Rodriguez
(74) *Attorney, Agent, or Firm*—Oliff & Berridge, PLC

(57) ABSTRACT

A braking pressure control apparatus for a hydraulically operated brake, including a first hydraulic system having a first hydraulic pressure source power-operated to pressurize a working fluid and capable of controlling the fluid pressure, for operating the brake, a second hydraulic system having a second hydraulic pressure source operable by an operating force acting on a manually operable brake operating member, to pressurize the working fluid to a pressure higher than a level corresponding to the operating force, for operating the brake, a switching device operable to selectively establish a first state in which the brake is operated with the pressurized fluid delivered from the first hydraulic pressure source, and a second state in which the brake is operated with the pressurized fluid delivered from the second hydraulic pressure source, and a diagnosing device operable to diagnose the second hydraulic system on the basis of the fluid pressure in the second hydraulic system.

32 Claims, 16 Drawing Sheets

FIG. 7A

| STOP SWITCH | STROKE SENSORS | PM, PB SENSORS | ACC SENSORS | DIAGNOSIS | TREATMENT |
|---|---|---|---|---|---|
| ON | NORMAL OUTPUTS | NORMAL OUTPUTS | NORMAL OUTPUTS | NORMAL (A) | CONTROL CONTINUED |
| | | | NO OUTPUTS | IMPOSSIBLE TO DIAGNOSE (B) | CONTROL TERMINATED |
| | | ABNORMAL OR NO OUTPUTS | NORMAL OUTPUTS | ABNORMAL SECOND SYSTEM (FIG. 8) (C) | SEE FIG. 8 |
| | | | NO OUTPUTS | ABNORMAL PUMP DEVICE (D) | CONTROL TERMINATED |
| | NO OUTPUTS | NORMAL OUTPUTS | NORMAL OUTPUTS | ABNORMAL STROKE SENSORS (E) | USING PM,PB SENSORS IN PLACE OF STROKE SENSORS |
| | | | NO OUTPUTS | IMPOSSIBLE TO DIAGNOSE (F) | CONTROL TERMINATED |

FIG. 7B

| STOP SWITCH | STROKE SENSORS | PM, PB SENSORS | ACC SENSORS | DIAGNOSIS | TREATMENT |
|---|---|---|---|---|---|
| ON | NO OUTPUTS | ABNORMAL OR NO OUTPUTS | NORMAL OUTPUTS | ABNORMAL STOP SWITCH (G) | CONTINUING CONTROL AND IGNORING STOP SWITCH OUTPUT |
| | | | NO OUTPUTS | ABNORMAL STOP SWITCH AND PUMP DEVICE (H) | TERMINATING CONTROL |
| OFF | NORMAL OUTPUTS | NORMAL OUTPUTS | NORMAL OUTPUTS | ABNORMAL STOP SWITCH (I) | CONTINUING CONTROL AND IGNORING STOP SWITCH OUTPUT |
| | | | NO OUTPUTS | IMPOSSIBLE TO DIAGNOSE (J) | TERMINATING CONTROL |
| | | ABNORMAL OR NO OUTPUTS | NORMAL OUTPUTS | ABNORMAL STROKE SENSORS (K) | USING PM, PM SENSORS IN PLACE OF STROKE SENSORS |
| | | | NO OUTPUTS | ABNORMAL PUMP DEVICE (L) | TERMINATING CONTROL |

FIG. 7C

| STOP SWITCH | STROKE SENSORS | PM, PB SENSORS | ACC SENSORS | DIAGNOSIS | TREATMENT |
|---|---|---|---|---|---|
| OFF | NO OUTPUTS | NORMAL OUTPUTS | NORMAL OUTPUTS | ABNORMAL STOP SWITCH AND STROKE SENSORS (M) | USING PM, PB SENSORS IN PLACE OF STROKE |
| | | | NO OUTPUTS | IMPOSSIBLE TO DIAGNOSE (N) | TERMINATING CONTROL |
| | | ABNORMAL OR NO OUTPUTS | NORMAL OUTPUTS | NORMAL (O) | CONTINUING CONTROL |
| | | | NO OUTPUTS | ABNORMAL PUMP DEVICE (P) | TERMINATING CONTROL |

FIG. 8

| STROKE SENSORS | PM SENSOR | PB SENSOR | ACC SENSORS | DIAGNOSIS | TREATMENT |
|---|---|---|---|---|---|
| NORMAL OUTPUTS | REDUCED OUTPUT | NO OUTPUT | NORMAL OUTPUTS | ABNORMAL PRESSURE REGULATOR (C1) | DETERMINING DESIRED WHEEL BRAKE CYLINDER PRESSURE |
| NORMAL OUTPUTS | NO OUTPUT | NO OUTPUT | NORMAL OUTPUTS | ABNORMAL PRESSURIZING PISTON (C2) | DETERMINING DESIRED WHEEL BRAKE CYLINDER PRESSURE |
| NORMAL OUTPUTS | NO OUTPUT | NORMAL OUTPUT | NORMAL OUTPUTS | IMPOSSIBLE TO DIAGNOSE (C3) | SWITCHING TO SECOND CONTROL MODE |

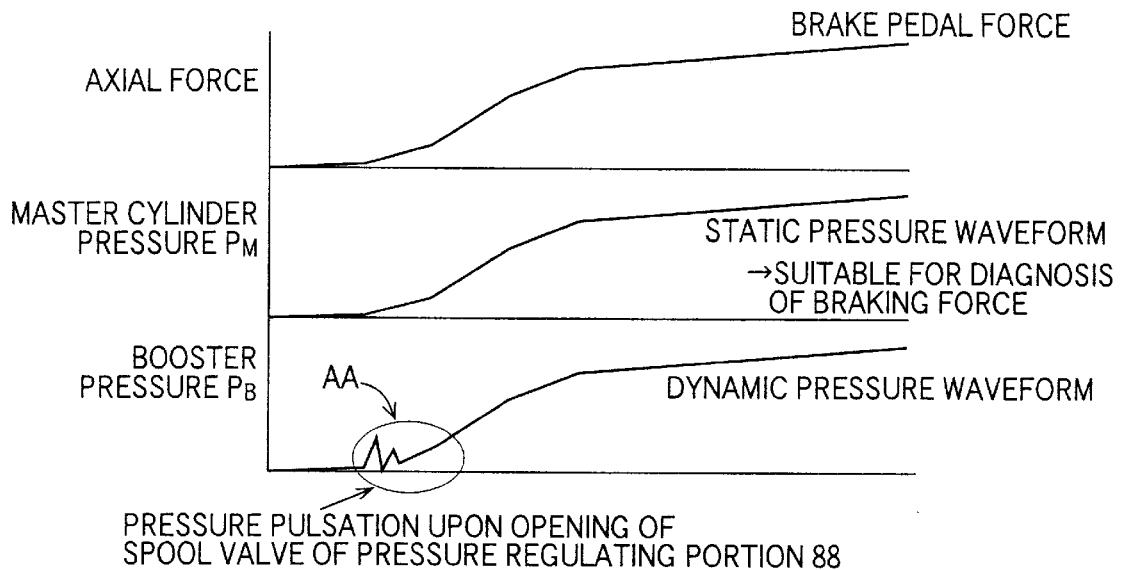
FIG. 9A IN NORMAL STATE
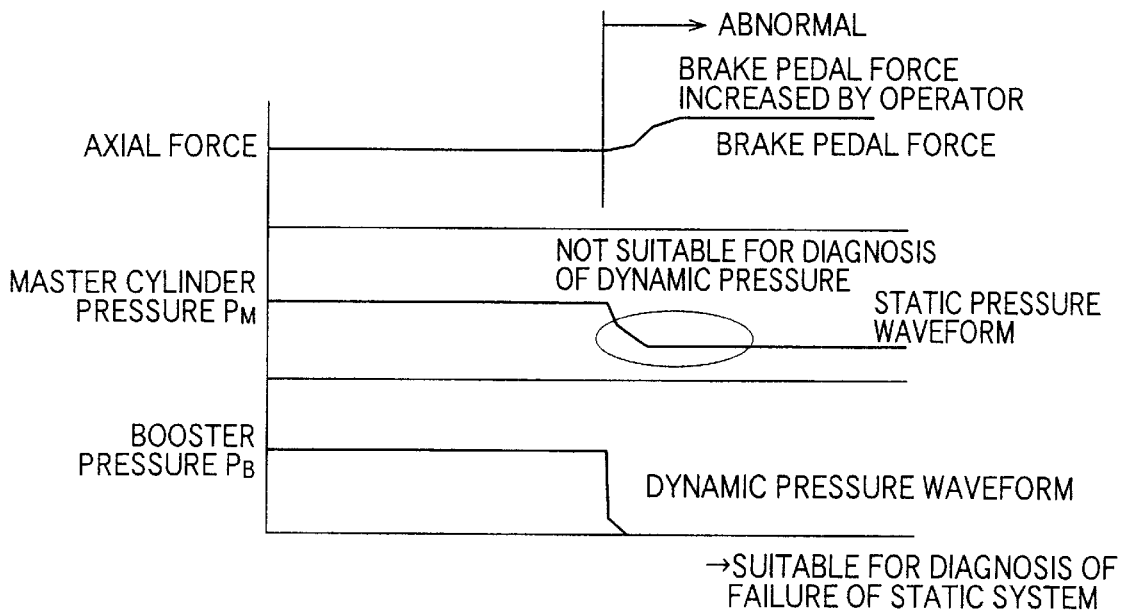
FIG. 9B IN ABNORMAL STATE

BRAKING PRESSURE CONTROL APPARATUS HAVING DEVICE FOR DIAGNOSING MANUALLY OPERATED HYDRAULIC SYSTEM

This application is based on Japanese Patent Application No. 11-367990 filed Dec. 24, 1999, the contents of which are incorporated hereinto by reference.

BACKGROUND OF THE INVENTION

1. Field of the Invention

The present invention relates to a braking pressure control apparatus including a diagnosing device.

2. Discussion of Related Art

JP-A-10-100884 discloses an example of a braking pressure control apparatus including a diagnosing device. The braking pressure control apparatus disclosed in this publication includes (1) a first hydraulic system including a first hydraulic pressure source which is power-operated to pressurize a working fluid and capable of controlling a pressure of the pressurized fluid, for operating a brake with the pressurized fluid delivered from the first hydraulic pressure source, (2) a second hydraulic system including a second hydraulic pressure source in the form of a master cylinder which is operable by an operating force acting on a manually operated brake operating member, to pressurize the working fluid to a pressure corresponding to the operating force, for operating the brake with the pressurized fluid delivered from the master cylinder, (3) a switching device for selectively establishing a first state in which the brake is operated with the pressurized fluid delivered from the first hydraulic pressure source, and a second state in which the brake is operated with the pressurized fluid delivered from the second hydraulic pressure source, and (4) a diagnosing device operable to diagnose the second hydraulic system for any abnormality on the basis of the pressure of the fluid in the master cylinder and the pressure of the fluid in the brake.

In the braking pressure control apparatus disclosed in the publication identified above, the second hydraulic pressure source is adapted to deliver the pressurized fluid on the basis of the operating force of the brake operating member, but the pressure of the pressurized fluid delivered from the second hydraulic pressure source is not higher than a level corresponding to the operating force of the brake operating member. Therefore, the diagnosing device used in this conventional braking pressure control apparatus may suffer from a drawback if the diagnosing device is used for a second hydraulic system which includes a second hydraulic pressure source adapted to deliver the working fluid to a pressure higher than a level corresponding to the operating force of the brake operating member.

SUMMARY OF THE INVENTION

It is an object of the present invention to provide a braking pressure control apparatus including a diagnosing device suitable for diagnosing a second hydraulic system which includes a second hydraulic pressure source adapted to pressurize the working fluid to a pressure higher than a level corresponding to the operating force of the brake operating member.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking pressure control apparatus for a hydraulically operated brake, comprising:

a first hydraulic system including a first hydraulic pressure-source which is power-operated to pressurize a working fluid and capable of controlling a pressure of the pressurized fluid, for operating the brake with the pressurized fluid delivered from the first hydraulic pressure source;

a second hydraulic system including a manually operable brake operating member, and a second hydraulic pressure source which is operable by an operating force acting on the brake operating member, to pressurize the working fluid to a pressure higher than a level corresponding to the operating force, for operating the brake with the pressurized fluid delivered from the second hydraulic pressure source;

a switching device operable to selectively establish a first state in which the brake is operated with the pressurized fluid delivered from the first hydraulic pressure source, and a second state in which the brake is operated with the pressurized fluid delivered from the second hydraulic pressure source; and a diagnosing device operable to diagnose the second hydraulic system on the basis of a pressure of the fluid in the second hydraulic system.

In the braking pressure control apparatus according to the above mode (1) of this invention, the second hydraulic system provided to pressurize the fluid to a pressure level higher than a level corresponding to the operating force of the brake operating member can be diagnosed for any abnormality, by the diagnosing device on the basis of the fluid pressure in the second hydraulic system. As described in detail with respect to various specific forms or modes of this invention, the time required for diagnosing the second hydraulic system can be significantly reduced. In this respect, it is noted that a difference between the fluid pressure in the second hydraulic pressure source and the fluid pressure in the brake is generally larger than a difference between the fluid pressure in the master cylinder and the fluid pressure in the brake. If the second hydraulic system were diagnosed on the basis of the difference between the fluid pressure in the second hydraulic pressure source and the fluid pressure in the brake, as in the conventional braking pressure control apparatus wherein the second hydraulic system is diagnosed on the basis of the difference between the master cylinder pressure and the fluid pressure in the brake, it would take a longer time for the fluid pressure in the second hydraulic pressure source and the fluid pressure in the brake to become equal to each other. The present braking pressure control apparatus has a further advantage that a hydraulic booster included in the second hydraulic pressure source can be diagnosed. In the conventional braking pressure control apparatus, the hydraulic booster cannot be diagnosed.

The fluid pressure in the second hydraulic system on which the second hydraulic system is diagnosed may include a pressure of the fluid in the second hydraulic pressure source, a pressure of the fluid in a fluid passage connecting the second hydraulic pressure source and a cylinder for the brake, and a pressure in the brake during an operation of the brake with the pressurized fluid delivered from the second hydraulic pressure source.

Abnormalities of the second hydraulic system that can be detected by the diagnosing device include; abnormalities of elements of the second hydraulic system (e.g., an abnormality of the second hydraulic pressure source); and abnormalities of detectors provided to detect the operating states of the above-indicated elements (e.g., an abnormality of a pressure sensor for detecting the fluid pressure in the second hydraulic pressure source). Where the present braking pressure control apparatus is adapted to control the pressure of the fluid pressurized by the first hydraulic pressure source on the basis of the detectors indicated above, these detectors may be considered to be elements of the first hydraulic system. Since those detectors are used to detect the operating states of the elements of the second hydraulic system, however, the detectors are considered to be included in the second hydraulic system, in the present application.

In the above mode (1), the "level corresponding to the operating force" of the manually operable brake operating member is typically a pressure linearly proportional to the operating force of the brake operating member. However, the pressure level corresponding to the operating force need not be linearly proportional to the operating force, provided that the pressure level in question is determined depending upon the operating force. (2) A braking pressure control apparatus according to the above mode (1), wherein the diagnosing device diagnoses the second hydraulic system on the basis of the pressure of the fluid pressurized by the second hydraulic pressure source and a pressure of the fluid in the manually operable brake while the second state is established by the switching device.

In the braking pressure control apparatus according to the above mode (2), the diagnosis of the second hydraulic system is effected on the basis of the pressure of the fluid pressurized by the second hydraulic pressure source and the fluid pressure in the brake. In the second state, the second pressure source and the hydraulic cylinder of the brake are held in communication with each other, so that the fluid pressure in the brake must be substantially equal to the pressure of the fluid pressurized by the second hydraulic pressure source if the second hydraulic system is normal. When the absolute value of a difference between the pressure of the second hydraulic pressure source and the pressure of the brake is larger than a predetermined threshold, for instance, it indicates an abnormality of at least one of the pressure sensors provided to detect the pressures of the second hydraulic pressure source and the brake cylinder, or an abnormality of at least one of the second hydraulic pressure source, a fluid passage connecting the second hydraulic pressure source and the brake cylinder, and the brake cylinder.

In the braking pressure control apparatus according to the above mode (2), the second hydraulic system is diagnosed while the brake operating member is operated and while the second state is established by the switching device. Namely, the second hydraulic system is diagnosed at an opportunity other than an initial check of the apparatus prior to an operation of the brake. Thus, the number of opportunities at which the second hydraulic system is diagnosed is increased.

When a command to diagnose the second hydraulic system is generated while the brake is operated in the first state, the diagnosis is effected after the first state is switched to the second state. Where the brake is used to brake a wheel of a vehicle, the switching to the second state is preferably effected while the vehicle is stationary. The switching from the first state to the second state may cause a change in the braking force generated by the brake. This change does not give an adverse influence on the vehicle if the change takes place while the vehicle is stationary. In this case, the diagnosis is effected while the vehicle is stationary.

Where the diagnosis of the second hydraulic system is effected after the operating or control state of the apparatus is switched from the first state to the second state, it is desirable to first control the first hydraulic pressure source in the first state so that the fluid pressure in the brake is controlled to a level that is to be established when the second state is established, and then switch the operating state to the second state. This arrangement makes it possible to reduce the amount of change of the fluid pressure in the brake upon switching of the operating state from the first state to the second state. In this case, it is possible to rapidly increase the fluid pressure in the brake cylinder to a level close to the level of the second hydraulic pressure source. Accordingly, the time required for diagnosing the second hydraulic system is reduced. (3) A braking pressure control apparatus according to the above mode (2), wherein the diagnosing device includes a switching portion operable when the first state is established, to change the first state to the second state after the fluid pressure in the brake has been controlled in the first state to a level close to the fluid pressure in the second hydraulic pressure source.

(4) A braking pressure control apparatus according to the above mode (2) or (3), wherein the second hydraulic system comprises:

a first pressure sensing device for detecting the pressure of the fluid pressurized by the second hydraulic pressure source; and a second pressure sensing device for detecting the pressure of the fluid in the brake, and wherein the diagnosing device includes a sensor-diagnosing portion operable to diagnose at least one of the first and second pressure sensing devices, on the basis of the pressures detected by the first and second sensing devices.

The sensor-diagnosing portion of the diagnosing device provided according to the above mode (4) may be adapted to determine that at least one of the first and second pressure sensing devices is abnormal, if the absolute value of a difference between the fluid pressures of the brake and the second hydraulic pressure source which are detected by the respective first and second pressure sensing devices is larger than a predetermined threshold value.

(5) A braking pressure control apparatus according to the above mode (4), further comprising:

a first braking pressure control device operable while the first state is established by the switching device, to control the pressure of the fluid in the brake on the basis of the pressure of the fluid detected by the first pressure sensing device; and a second braking pressure control device operable when the sensor-diagnosing portion determines that the first pressure sensing device is abnormal while the first state is established by the switching device, the second braking pressure control device controlling the pressure of the fluid in the brake on the basis of an operating amount of the manually operable brake operating member.

In the braking pressure control apparatus according to the above mode (5), the fluid pressure in the brake is controlled by the first braking pressure control device while the second hydraulic system is diagnosed to be normal. Since the pressure of the pressurized fluid corresponds to the operating force of the brake operating member, the fluid pressure in the brake can be controlled on the basis of the fluid pressure detected by the first pressure sensing device, such that the braking force generated by the brake is controlled as desired by the operator of an automotive vehicle where the present braking pressure control apparatus is used for braking the vehicle. For instance, the fluid pressure in the brake is controlled so that the detected actual braking force coincides with a desired value determined by the detected operating amount of the brake operating member.

Where the first hydraulic system includes a power-operated pressurizing device, and a pressure control valve device for controlling the pressure of the fluid pressurized by the pressurizing device, the fluid pressure in the hydraulically operated brake can be controlled by controlling the pressure control valve device. Where the first hydraulic system does not include a pressure control valve device as described above, the fluid-pressure in the brake can be controlled by controlling an amount of power to be supplied to the pressurizing device.

When the second pressure sensing device of the second hydraulic system is diagnosed to be abnormal, the fluid pressure in the brake is controlled by the second braking pressure control device, on the basis of the operating amount of the manually operable brake operating member. The operating amount may be the operating stroke or force of the brake operating member. By controlling the fluid pressure in the brake on the basis of the operating stroke or force of the brake operating member, the fluid pressure in the brake can be controlled so as to generate the braking force as desired by the vehicle operator, as in the case where the fluid pressure in the brake is controlled on the basis of the pressure of the fluid pressurized by the second hydraulic pressure source.

As described later in detail in the DETAILED DESCRIPTION OF THE PREFERRED EMBODIMENTS, the fluid pressure in the brake may be controlled on the basis of the operating stroke of the brake operating member, the fluid pressure of the second hydraulic pressure source, and a predetermined weight of the operating stroke and the fluid pressure of the second hydraulic pressure source with respect to each other, while the second hydraulic system is normal, and on the basis of only the operating stroke of the brake operating member while the second hydraulic system is abnormal. In the later case, that is, where the second hydraulic system is abnormal, no weight is given on the fluid pressure of the second hydraulic pressure source, and the weight or ratio of the operating stroke with respect to the fluid pressure of the second hydraulic pressure source is equal to "1".

(6) A braking pressure control apparatus according to any one of the above modes (1)–(5), wherein the second hydraulic system comprises:

a hydraulic booster including a power piston which is operatively connected to the manually operable brake operating member and which partially defines a booster chamber on a rear side of the power piston as viewed in a direction of an advancing movement of the power piston when the brake operating member is operated, the booster chamber being arranged to receive a pressurized fluid whose pressure corresponds to the operating force of the brake operating member; and a booster pressure sensor for detecting the pressure of the pressurized fluid in the booster chamber, and wherein the diagnosing device diagnoses the second hydraulic system on the basis of the pressure of the pressurized fluid in the booster chamber detected by the booster pressure sensor.

In the braking pressure control apparatus according to the above mode (6), the diagnosing device may be arranged to determine that the second hydraulic pressure source is abnormal, if the fluid pressure in the booster chamber of the hydraulic booster is lower than a predetermined threshold value (lower limit). In this case, it is considered that at least the hydraulic booster is not normally functioning. The threshold value used by the diagnosing device may be a value almost equal to the atmospheric pressure.

(7) A braking pressure control apparatus according to the above mode (6), wherein the second hydraulic system comprises:

a master cylinder including a pressurizing piston which is operatively connected to the power piston and which partially defines a pressurizing chamber on one of opposite sides thereof remote from the power piston; and a master-cylinder pressure sensor for detecting a pressure of the fluid in the pressurizing chamber, and wherein the diagnosing device diagnoses the second hydraulic system on the basis of the fluid pressure detected by the master-cylinder pressure sensor and the fluid pressure detected by the booster pressure sensor.

In the braking pressure control apparatus according to the above mode (7) wherein the fluid pressure in the pressurizing chamber of the master cylinder as well as the fluid pressure in the booster chamber of the hydraulic booster is used by the diagnosing device to diagnose the second hydraulic system, the second hydraulic system can be diagnosed with a higher decree of accuracy than when only the fluid pressure in the booster chamber is used for the diagnosis. Further, the present arrangement has an advantage of permitting a more detailed diagnosis of the second hydraulic system, for instance, a diagnosis as to whether the hydraulic booster or the master cylinder is abnormal.

The second hydraulic system is generally designed such that the fluid pressure in the master cylinder and the fluid pressure in the hydraulic booster are equal to each other. It is also noted that the fluid in the pressurizing chamber is pressurized to a level corresponding to a distance of the advancing movement of the pressurizing piston, so that it is possible to determine that the pressurizing piston has been advanced by only the operating force of the brake operating member, or by both the operating force of the brake operating member and an assisting force based on the fluid pressure in the booster chamber, if the fluid pressure in the pressurizing chamber of the master cylinder is higher than a predetermined threshold or lower limit. It is also possible to determine that the hydraulic booster is not normally functioning, if the fluid pressure in the booster chamber is lower than the predetermined threshold, as described above with respect to the above mode (6).

Therefore, the use of the fluid pressure in the master cylinder and the fluid pressure in the hydraulic booster improves the accuracy or reliability of diagnosis of the second hydraulic system by the diagnosing device, or permits the detailed diagnosis of the second hydraulic system. For instance, the diagnosing device may be arranged to determine that the second hydraulic system is normal, when the fluid pressures of the master cylinder and the hydraulic booster are equal to each other, and when these fluid pressures are both higher than the respective threshold values. Further, the diagnosing device may determine that the master cylinder and the hydraulic booster are both normal, when the conditions indicated above are satisfied. Other forms of diagnosis by the diagnosing device will be described with respect to the following modes (8) and (9).

(8) A braking pressure control apparatus according to the above mode, wherein the diagnosing device determines that the master cylinder is normal while the hydraulic booster is abnormal, when the pressure of the fluid in the pressurizing chamber detected by the master-cylinder pressure sensor is not lower than a predetermined threshold, while the pressure of the fluid in the booster chamber detected by the booster pressure sensor is lower than a predetermined threshold.

In the above conditions in which the pressure in the pressurizing chamber is not lower than the threshold while the pressure in the booster chamber is lower than the threshold, it is possible to determine that the fluid in the pressurizing chamber is pressurized as a result of an advancing movement of the pressurizing piston with the operating force of the brake operating member, but not as a result of the assisting force based on the fluid pressure in the booster chamber. In this case, it is possible to determine that the master cylinder is normal while the hydraulic booster is abnormal. It is desirable that the threshold for the fluid pressure in the pressurizing chamber be higher than the threshold for the fluid pressure in the booster chamber.

(9) A braking pressure control apparatus according to the above mode (7) or (8), wherein said hydraulic booster includes a pressure regulating portion which is connected to a high-pressure source capable of delivering a pressurized fluid whose pressure is higher than a maximum pressure of the fluid pressurized by the second hydraulic pressure source and which is operable to regulate the pressure of the pressurized fluid received from the high-pressure source to a level corresponding to the pressure of the fluid in the pressurizing chamber, the hydraulic booster having a fluid passage through which the pressurized fluid whose pressure has been regulated by the pressure regulating portion is supplied to the booster chamber, and wherein the diagnosing device determines that the master cylinder is abnormal, when the fluid pressure in the pressurizing chamber detected by the master-cylinder pressure sensor is lower than a predetermined threshold while the fluid pressure in the booster chamber detected by the booster pressure sensor is lower than a predetermined threshold.

Where the fluid in the pressurizing chamber cannot be pressurized due to an abnormality of the master cylinder, the pressure of the pressurized fluid as regulated by the pressure regulating portion of the hydraulic booster is substantially equal to the atmospheric level, so that the pressure of the fluid in the booster chamber is also substantially equal to the atmospheric level. In this case, therefore, it is possible to determine that the master cylinder is abnormal. Abnormalities of the master cylinder include a sticking of the pressurizing piston at a certain position in the cylinder bore of the master cylinder due to a damage of the pressurizing piston and/or the cylinder bore.

The second hydraulic system may be diagnosed to be abnormal, when the fluid pressure in the pressurizing chamber of the master cylinder is lower than the fluid pressure in the booster chamber of the hydraulic booster, even if the fluid pressures in the pressurizing and booster chamber are both higher than the respective threshold values.

(10) A braking pressure control apparatus according to any one of the above modes (6)–(9), further comprising:

a first braking pressure control device operable while the first state is established by the switching device, to control the pressure of the fluid in the brake on the basis of the pressure of the fluid detected by the first pressure sensing device; and a second braking pressure control device operable when the sensor-diagnosing portion determines that the first pressure sensing device is abnormal while the first state is established by the switching device, the second braking pressure control device controlling the pressure of the fluid in the brake on the basis of an operating amount of the manually operable brake operating member, and wherein the second hydraulic system comprises:

a master cylinder including a pressurizing piston which is operatively connected to the power piston and which partially defines a pressurizng chamber on one of opposite sides thereof remote from the power piston; and a master-cylinder pressure sensor for detecting a pressure of the fluid in the pressurizing chamber, and wherein the first braking pressure control device includes a portion operable to control the pressure of the fluid in the brake on the basis of the pressure of the fluid in the pressurizing chamber detected by the master-cylinder pressure sensor.

The fluid in the pressurizing chamber of the master cylinder is pressurized to a level corresponding to the operating force of the brake operating member, so that the fluid pressure in the brake can be controlled to a level corresponding to the operating force of the brake operating member, by controlling the fluid pressure in the brake on the basis of the fluid pressure in the pressurizing chamber. Although the fluid pressure in the brake can be controlled to the level corresponding to the operating force of the brake operating member, on the basis of the fluid pressure in the booster chamber of the hydraulic booster, this control of the fluid pressure in the brake cannot be effected if the hydraulic booster is abnormal. In the braking pressure control apparatus according to the above mode (10) wherein the fluid pressure in the brake is controlled on the basis of the fluid pressure in the pressurizing chamber, the fluid pressure in the brake can be controlled to the level corresponding to the operating force of the brake operating member, even when the hydraulic booster is abnormal. Thus, the braking pressure control apparatus according to the above mode (10) assures an increased degree of reliability of control of the fluid pressure in the brake according to the brake operating force.

(11) A braking pressure control apparatus according to any one of the above modes (1)–(10), wherein the second hydraulic system comprises:

a pressure sensing device for detecting the pressure of the fluid pressurized by the second hydraulic pressure source; and an operating amount sensing device for detecting an operating amount of the manually operated brake operating member, and wherein the diagnosing device diagnoses the second hydraulic system on the basis of the pressure of the pressurized fluid detected by the pressure sensing device and the operating amount of the brake operating member detected by the operating amount sensing device.

The fluid is pressurized by the second hydraulic pressure source to a level corresponding to the operating amount of the brake operating member. That is, there is a predetermined ideal or normal relationship between the operating amount of the brake operating member and the pressure of the fluid pressurized by the second hydraulic pressure source. Accordingly, the second hydraulic system can be diagnosed on the basis of a relationship between the actually detected values of those two parameters as compared with the normal relationship.

In the braking pressure control apparatus according to the above mode (11), the diagnosing device is capable of diagnosing the second hydraulic system while either of the first state and the second state is established by the switching device. Usually, the relationship between the brake operating amount of and the fluid pressure of the second hydraulic pressure source in the first state is different from that in the second state. In either of these two states, however, the second hydraulic system can be diagnosed by determining whether there exists the predetermined ideal or normal relationship between the detected values of those two parameters.

Further, the cylinder of the brake can be diagnosed for the presence of air in the brake cylinder, on the basis of the relationship between the operating stroke (as the operating amount) of the brake operating member and the fluid pressure of the second hydraulic pressure source in the second state of the apparatus. A relatively low rate of increase of the fluid pressure in the brake cylinder with an increase of the brake operating stroke indicates the presence of air in the brake cylinder.

(12) A braking pressure control apparatus according to the above mode (11), wherein the second hydraulic system includes a plurality of brake cylinders for respective brakes, and fluid passages connecting the brake cylinders to the second hydraulic pressure source, the fluid passages including at least one main fluid passage connected to the second hydraulic pressure source, and at lest one connecting passage each of which is connected to one of the at least one main fluid passage and connects at least two of the plurality of brake cylinders to each other, the braking pressure control apparatus further comprising:

a communicating valve provided in at least one of the at least one connecting passage and is operable between an open state in which the at least two brake cylinders are held in communication with each other, and a closed state in which the at least two brake cylinders are disconnected from each other, and wherein the diagnosing device diagnoses the at least two brake cylinders for the presence of air contained therein, on the basis of amounts of change of the operating stroke of the brake operating member and the pressure of the fluid pressurized by the second hydraulic pressure source while the communicating valve is placed in the open state and those while the communicating valve is placed in the closed state.

While the communicating valve is placed in the open state, the fluid pressurized by the second hydraulic pressure source is delivered to all of the at least two brake cylinders through the corresponding main fluid passage and connecting passage. While the communication valve is placed in the closed state, the fluid pressurized by the second hydraulic pressure source is not delivered to the brake cylinder or cylinders which is/are connected to the main fluid passage through the connecting passage. Based on these facts, each of the brake cylinders can be diagnosed for the presence of air contained therein, on the basis of the amounts of change of the brake operating stroke and the fluid pressure of the second hydraulic pressure source while the communicating valve is in the open state and those while the communication valve is in the closed sate.

For instance, the two brake cylinders are connected to the second hydraulic pressure source such that one of the brake cylinders is connected directly to the second hydraulic pressure source through the main fluid passage, while the other brake cylinder is connected to the second hydraulic pressure source through the connecting passage and the main fluid passage. In this instance, the fluid pressurized by the second hydraulic pressure source is delivered to only one of the two brake cylinders and not to the other brake cylinder while the communicating valve provided in the connecting passage is placed in the closed state. If the amount of change of the fluid pressure of the second hydraulic pressure source with respect to the brake operating amount is excessively small in the closed state of the communicating valve, it indicates that air is contained in the above-indicated one brake cylinder. If the amount of change of the fluid pressure of the second hydraulic pressure source is normal in the closed state of the communicating valve but is excessively small in the open state, it indicates that air is contained in the other brake cylinder.

(13) A braking pressure control apparatus according to any one of the above modes (1)–(12), wherein the second hydraulic system includes a high-pressure source capable of delivering a pressurized fluid whose pressure is higher than a maximum pressure of the fluid pressurized by the second hydraulic pressure source, and wherein the diagnosing device diagnoses the second hydraulic system on the basis of the pressure of the pressurized fluid of the high-pressure source as well as the pressure of the fluid pressurized by the second hydraulic pressure source.

The accuracy of diagnosis of the second hydraulic pressure source can be improved when the diagnosis is based on the pressure of the pressurized fluid delivered from the high-pressure source and the pressure of the second hydraulic pressure source. When the pressure of the high-pressure source is lower than a predetermined threshold, the pressure of the fluid pressurized by the second hydraulic pressure source may be abnormally lower or the fluid may not be pressurized by the second hydraulic pressure source. When the pressure of the second hydraulic pressure source is excessively low while the pressure of the high-pressure source is in a normal range, it means that the second hydraulic pressure source is abnormal.

The high-pressure source of the second hydraulic system may be separate from a high-pressure source of the first hydraulic system. Alternatively, a single high-pressure source may be commonly used for the first and second hydraulic systems. In the latter case, the braking pressure control apparatus is simplified and small-sized.

(14) A braking pressure control apparatus for a hydraulically operated brake including a brake cylinder, comprising:

a first hydraulic system including a first hydraulic pressure source which is power-operated to pressurize a working fluid and capable of controlling a pressure of the pressurized fluid to be delivered to the brake cylinder for operating the brake with the pressurized fluid delivered from the first hydraulic pressure source;

a second hydraulic system including a manually operable brake operating member, and a second hydraulic pressure source which is operable by an operating force acting on the brake operating member, to pressurize the working fluid to a pressure corresponding to the operating force, so that the fluid pressurized by the second hydraulic pressure source is delivered to the brake cylinder for operating the brake;

a switching device operable to selectively establish a first state in which the brake cylinder is supplied with the pressurized fluid delivered from the first hydraulic pressure source, and a second state in which the brake is supplied with the pressurized fluid delivered from the second hydraulic pressure source;

a stroke simulator device including a stroke simulator connected to the second hydraulic pressure source, and a simulator shut-off valve having a closed state in which the stroke simulator is disconnected from the second hydraulic pressure source, and an open state in which the stroke simulator is in communication with the second hydraulic pressure source: and a diagnosing device operable to diagnose the stroke simulator device on the basis of an amount of change of an operating stroke of the brake operating member and an amount of change of the pressure of the fluid pressurized by the second hydraulic pressure source.

There is a know ideal or normal relationship between the amount of change of the operating stroke of the brake operating member and the amount of change of the pressure of the fluid pressurized by the second hydraulic pressure source while the stroke simulator device is normal. By comparing a relationship between the detected actual amounts of change of those two parameters with the normal relationship, the stroke simulator device can be diagnosed for any abnormality.

Abnormalities of the stroke simulator device include a fluid leakage from the stroke simulator, and an abnormality of the simulator shut-off valve (sticking of a valve member in the open or closed state of the valve).

If the amount of change of the fluid pressure of the second hydraulic pressure source with respect to the amount of change of the brake operating stroke while the simulator shut-off valve is commanded to be placed in its closed state is abnormally small, it indicates that the simulator shut-off valve is abnormally kept in its open state due to sticking of its valve member.

If the amount of change of the fluid pressure of the second hydraulic pressure source with respect to the brake operating member while the simulator shut-off valve is commanded to be placed in its open state is abnormally large, it indicates that the simulator shut-off valve is abnormally kept in its closed state due to sticking of its valve member.

If the amount of change of the fluid pressure of the second hydraulic pressure source with respect to the brake operating member while the simulator shut-off valve is placed in its open state is extremely small, it indicates that the stroke simulator is suffering from a fluid leakage.

(15) A braking pressure control apparatus according to the above mode (14), wherein the diagnosing device diagnoses the stroke simulator device while the second state is established by the switching device.

The stroke simulator device can be diagnosed irrespective of whether the first or second state is established by the switching device. If the simulator shut-off valve is switched from the open state to the closed state while the first state is established, the brake operating stroke is reduced to a considerably small value, unexpectedly to the operator of the present apparatus (e.g., the operator of an automotive vehicle provided with the apparatus). In the second state, however, the switching of the simulator shut-off valve to the closed state will not cause a reduction of the brake operating stroke since the pressurized fluid is delivered from the second hydraulic pressure source to the brake cylinder.

The brake cylinder can be diagnosed for the presence of air contained therein, on the basis of the amounts of change of the brake operating stroke and the fluid pressure of the second hydraulic pressure source while the second state is established by the switching device. When the amount of change of the fluid pressure of the second hydraulic pressure source with respect to the brake operating stroke is abnormally small, however, it is not possible to determine whether the simulator shut-off valve is abnormally kept in its open state, or the brake cylinder contains air. In this case, a diagnosis is repeated in the same manner after the operating state of the apparatus is switched from the second state to the first state. This diagnosis makes it possible to determine whether the brake cylinder contains air or the simulator shut-off valve is abnormal.

(16) A braking pressure control apparatus according to the above mode (15), wherein the second hydraulic system includes a plurality of brake cylinders for respective brakes, and fluid passages connecting the brake cylinders to the second hydraulic pressure source, the fluid passages including at least one main fluid passage connected to the second hydraulic pressure source, and at lest one connecting passage each of which is connected to the main fluid passage and connects at least two of the plurality of brake cylinders to each other, the braking pressure control apparatus further comprising:

a communicating valve provided in at least one of the at least one connecting passage and is operable between an open state in which the at least two brake cylinders are held in communication with each other, and a closed state in which the at least two brake cylinders are disconnected from each other, and wherein the diagnosing device diagnoses the stroke simulator device while the communicating valve is placed in the closed state.

The amount of the pressurized fluid to be delivered from the second hydraulic pressure source to the plurality of brake cylinders is smaller when the communicating valve is placed in the closed state than when the communicating valve is placed in the open state. Accordingly, the amount of change of the fluid pressure of the second hydraulic pressure source with respect to the amount of change of the brake operating stroke when the stroke simulator device is normal is larger when the communicating valve is placed in the closed state than in the open state. Accordingly, the determination as to whether the stroke simulator device is normal or not can be made with a higher degree of accuracy when the communicating device is placed in the closed state.

It is also noted that the operating state of the brake operating member while the stroke simulator device is diagnosed by the diagnosing device in the second state of the apparatus is more similar to the operating state when the communicating valve is placed in the closed state than when it is placed in the open state. That is, the second hydraulic pressure source is disconnected from the brake cylinders and are held in communication with the stroke simulator when the apparatus is in the first state. In the second state in which the stroke simulator device is diagnosed, the operating state of the brake operating member as felt by the operator of the apparatus is more similar to that in the first state when some of the brake cylinders are disconnected from the second hydraulic pressure source by the communicating valve, than when all of the brake cylinders are communicated with the second hydraulic pressure source.

(17) A braking pressure control apparatus according to any one of the above modes (14)–(16), wherein the diagnosing device has a releasing passage connected at one end thereof to a low-pressure source and at the other end thereof to a portion of the stroke simulator device which is between the simulator shut-off valve and the stroke simulator, the diagnosing device including a releasing valve provided in the releasing passage and having an open state in which the stroke simulator device is communicated at the portion thereof to the low-pressure source, and a closed state in which the stroke simulator device is disconnected at the portion thereof from the low-pressure source, and wherein the diagnosing device diagnoses the stroke simulator device on the basis of the amount of changes of the operating stroke of the brake operating member and the pressure of the fluid pressurized by the second hydraulic pressure source while the releasing valve is placed in the open state.

While the simulator shut-off valve is in the closed state, the brake operating stroke will not be excessively large even when the releasing valve is in the open state. While the simulator shut-off valve is in the open state, however, the brake operating member may be excessively large when the releasing valve is in the open state.

Accordingly, the stroke simulator device can be accurately diagnosed by suitably controlling the simulator shut-off valve and the releasing valve, based on the phenomenon indicated above.

(18) A braking pressure control apparatus according to any one of the above modes (14)–(17), further comprising an alarming device operable to provide an alarm when the diagnosing device has determined that the stroke simulator device is abnormal.

While the apparatus is in the first state, the operating state of the brake is not necessarily influenced immediately after the stroke simulator device becomes abnormal. However, an abnormality of the stroke simulator device may cause an excessively large amount of increase or decrease of the operating stroke of the brake operating member. In this respect, the provision of the alarming device is desirable for informing the operator of the apparatus that the stroke simulator device has become abnormal.

(19) A braking pressure control apparatus according to any one of the above modes (1)–(18), further comprising a controller for controlling the switching device to selectively establish the first and second states, depending upon a result of a diagnosis by the diagnosing device.

Where the hydraulic booster or master cylinder of the second hydraulic system is diagnosed to be abnormal, for instance, the controller commands the switching device to establish the first state so that the brake is operated with the pressurized fluid delivered from the first hydraulic pressure source. When the diagnosis is effected in the first state, the first state is maintained. When the diagnosis is effected in the second state, the operating state of the apparatus is switched from the second state to the first state. In the first state, the braking force generated by the brake is not reduced due to the abnormality of the second hydraulic system.

Where any sensor used in the second hydraulic system is diagnosed to be abnormal, the controller may be adapted to command the switching device to establish the second state. The diagnosis effected in the first state usually uses the output of the sensor or sensors provided in the second hydraulic system. In this case, the operating state of the apparatus may be changed from the first state to the second state, only where there is/are not a sensor or sensors that can be substituted for the sensor or sensors which has/have been diagnosed to be abnormal, as described below with respect to the following mode (20). The first state is changed to the second state where a detected abnormality makes it difficult or impossible to control the fluid pressure in the brake as needed.

(20) A braking pressure control apparatus according to any one of the above modes (1)–(19), further comprising a first braking pressure control device operable while no abnormality is detected by the diagnosing device, for controlling the fluid pressure in the brake in a predetermined normal manner, and a second braking pressure control device operable while an abnormality associated with at least one of predetermined at least one sensor is detected by the diagnosing device, for controlling the fluid pressure in the brake in a manner different from the predetermined normal manner, without using an output of the above-indicated at least one of the predetermined at least one sensor.

The second hydraulic system may include a plurality of sensors or detectors at least one of which is used to control the fluid pressure in the brake in the first state. In this case, the apparatus may include a sensor or sensors that can be substituted for the above-indicated at least one sensor, when the latter is diagnosed to be abnormal. For instance, the output of a master-cylinder pressure sensor for detecting the pressure of the master cylinder of the second hydraulic pressure source is used to control the fluid pressure in the brake while the master-cylinder pressure sensor is normal. If this master-cylinder pressure sensor is found abnormal, the output of a stroke sensor for detecting the operating stroke of the brake operating member may be used for controlling the fluid pressure in the brake. In an alternative arrangement wherein the fluid pressure in the brake is controlled on the basis of the detected pressure of the master cylinder and the detected brake operating stroke, the control of the fluid pressure in the brake may be effected on the basis of only the detected brake operating stroke where the sensor for detecting the master cylinder pressure or the master cylinder per se is diagnosed to be abnormal. In another alternative arrangement, the control of the fluid pressure in the brake is effected on the basis of the detected fluid pressure of the master cylinder and the detected fluid pressure of the hydraulic booster. In this case, the control may be effected on the basis of only the detected master cylinder pressure where the sensor for detecting the pressure of the hydraulic booster or the hydraulic booster per se is diagnosed to be abnormal.

The "abnormality associated with at least one of predetermined at least one sensor" may be an abnormality of the sensor or sensors per se, or an abnormality of a device or devices whose operating state or physical quantity is detected by the sensor or sensors.

(21) A braking pressure control apparatus for a hydraulically operated brake, characterized by comprising:

a first hydraulic system including a first hydraulic pressure source which is power-operated to pressurize a working fluid and capable of controlling a pressure of the pressurized fluid, for operating the brake with the pressurized fluid delivered from the first hydraulic pressure source;

a second hydraulic system including a manually operable brake operating member, and a second hydraulic pressure source which is operable by an operating force acting on the brake operating member, to pressurize the working fluid to a pressure higher than a level corresponding to the operating force, for operating the brake with the pressurized fluid delivered from the second hydraulic pressure source;

a switching device operable to selectively establish a first state in which the brake is operated with the pressurized fluid delivered from the first hydraulic pressure source, and a second state in which the brake is operated with the pressurized fluid delivered from the second hydraulic pressure source; and a diagnosing device operable to diagnose the second hydraulic system on the basis of an operating state of the second hydraulic system.

In the braking pressure control apparatus according to the above mode (21), the second hydraulic system is diagnosed on the basis of its operating state.

(22) A braking pressure control apparatus according to any one of the above modes (1)–(21), further comprising a device for restricting an amount of change of at least one of an operating state of the brake operating member and the fluid pressure in the brake when the operating state of the apparatus is switched by the switching device between the first and second states.

(23) A braking pressure control apparatus according to any one of the above modes (1)–(22), further comprising a device for reducing a difference between the fluid pressure in the brake and the pressure of the fluid pressurized by the second hydraulic pressure source, when the operating state of the apparatus is switched by the switching device between the first and second states.

(24) A braking pressure control apparatus according to any one of the above modes (1)–(23), further comprising a device for reducing an amount of flow of the fluid between the second hydraulic pressure source and the brake when the operating state of the apparatus is switched by the switching device between the first and second states.

(25) A braking pressure control apparatus according to any one of the above modes (1)–(24), further comprising a device for restricting a rate of change of the fluid pressure in the brake when the operating state of the apparatus is switched by the switching device between the first and second states.

(26) A braking pressure control apparatus according to any one of the above modes (1)–(25), wherein the switching device switches the operating state of the apparatus from the first state to the second state, when the brake operating member is not in operation.

(27) A braking pressure control apparatus according to any one of the above modes (1)–(26), further comprising a device for restricting a change in control characteristic of the fluid pressure in the brake, when the operating state of the apparatus is switched by the switching device between the first and second states.

(28) A braking pressure control apparatus according to the above mode (27), wherein the above-indicated device for restricting a change in control characteristic controls the fluid pressure in the brake to a level which is expected to be established when the operating state has been switched from one of the first and second states to the other state.

(29) A braking pressure control apparatus according to any one of the above modes (1)–(28), further comprising a device for restricting a change in the operating state of the brake operating member unexpectedly to the operator of the apparatus, when the operating state of the apparatus is switched by the switching device between the first and second states.

(30) A braking pressure control apparatus according to any one of the above modes (1)–(29), further comprising a device for controlling the fluid pressure in the brake in a manner different from a predetermined normal manner, when the operating state of the apparatus is switched by the switching device between the first and second states.

(31) A braking pressure control apparatus according to any one of the above modes (1)–(30), further comprising a device for initiating an operation of restricting a change of at least one of the operating state of the brake operating member and the fluid pressure in the brake, when a symptom indicating that the operating state of the apparatus is likely to be switched by the switching device between the first and second states.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIGS. 7A, 7B and 7C are views showing a data table stored in the ROM, which table indicates various treatments for dealing with various kinds of abnormalities of a second hydraulic system of the braking system;

FIG. 8 is a view showing a part of the data table of FIGS. 7A–7C;

FIGS. 9A and 9B are graphs indicating changes of hydraulic pressures in the second hydraulic pressure source of the braking pressure control apparatus;

DETAILED DESCRIPTION OF THE PREFERRED EMBODIMENTS

Figure 1:
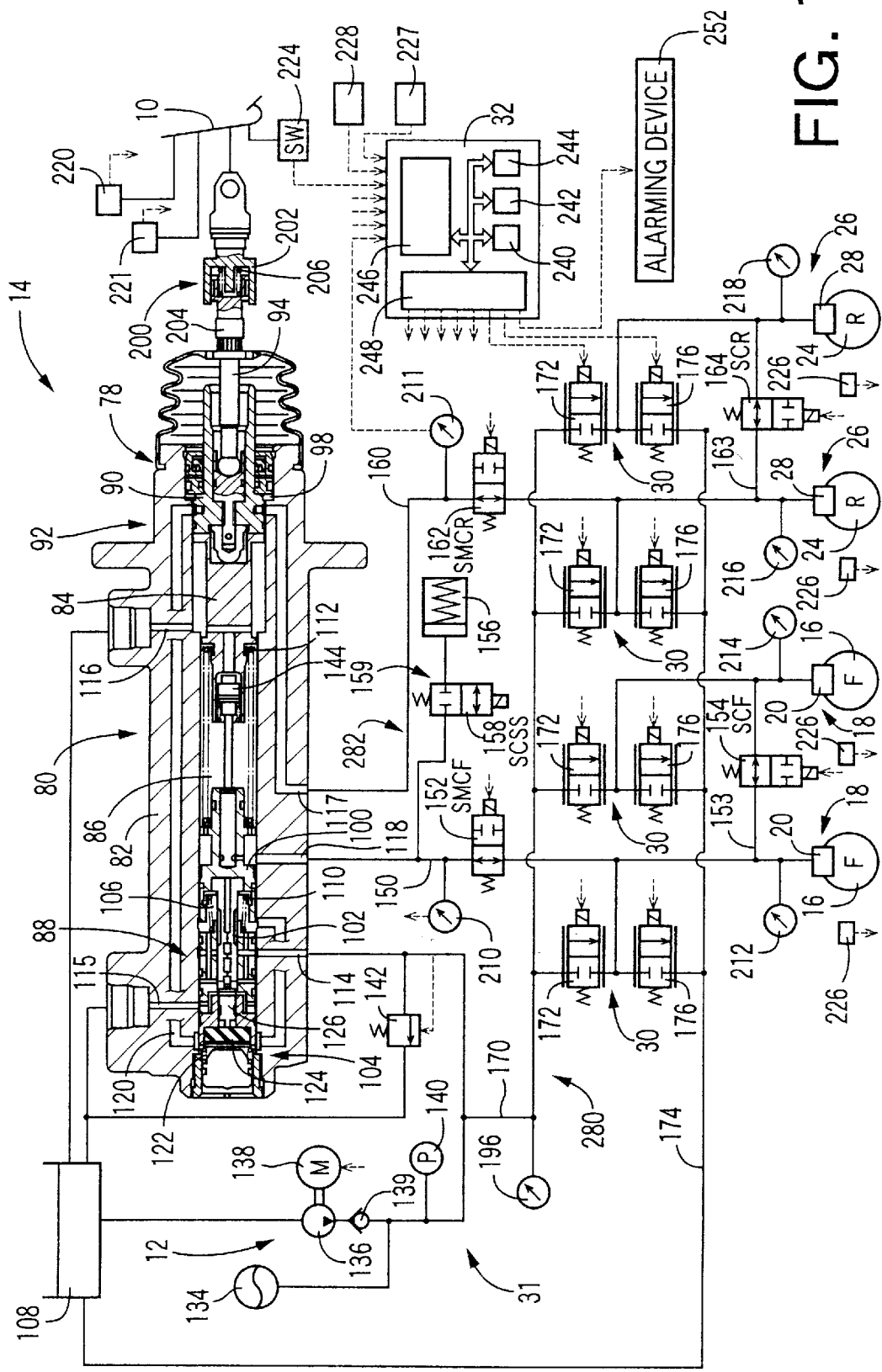
FIG. 1 is a schematic view of a braking system including a braking pressure control apparatus constructed according to one embodiment of this invention.

Referring first to FIG. 1, the hydraulically operated braking system shown therein includes a manually operable brake operating member in the form of a brake pedal 10, a pump device 12, a second hydraulic pressure source 14, front wheel brakes 18 having wheel brake cylinders 20 provided for respective front wheels 16, rear wheel brakes 26 having wheel brake cylinders 28 provided for respective rear wheels 24, and four linear valve devices 30 provided for the respective wheel brake cylinders 20, 28. In the present embodiment, the pump device 12 and the linear valve devices 30 constitute a first hydraulic pressure source 31. The braking system has a first control mode in which the wheel brake cylinder 20, 28 of each wheel 16, 24 is activated with a pressurized fluid delivered from the first hydraulic pressure source 31, and a second control mode in which the wheel brake cylinder 20, 28 is activated with a pressurized fluid delivered from the second hydraulic pressure source 14. The braking system is selectively placed in one of the first and second control modes In the first control mode, the fluid pressures in the individual wheel brake cylinders 20, 28 are controllable independently of each other by the respective linear valve devices 30. The first and second control modes are selectively established under the control of an electronic brake control unit 32 (hereinafter referred to as "ECU 32"). In the present invention, the linear valve devices 30 constitute a solenoid-operated pressure control valve device.

The second hydraulic pressure source 14 includes a hydraulic booster 78 and a master cylinder 80.

The master cylinder 80 has a housing 82, a pressurizing piston 84 fluid-tightly and slidably received within the housing 82, and a pressurizing chamber 86. A working fluid in the pressurizing chamber 86 is pressurized by an advancing movement of the pressurizing piston 84.

The hydraulic booster 78 includes a pressure regulating portion 88, and an input portion 92 including a power piston 90. The pressure regulating portion 88 is arranged to regulate the pressure of a pressurized fluid delivered from the pump device 12, to a level corresponding to. an operating force acting on the brake pedal 10. The brake pedal 10 is connected through an operating rod 94 to the power piston 90. The power piston 90 partially defines a rear pressurizing chamber (booster chamber) 98 on its rear side. The pressurized fluid the pressure of which is regulated by the pressure regulating portion 88 is supplied to the rear pressurizing chamber 98, so that the power piston 90 is advanced (moved in the left direction as seen in FIG. 1) by a force based on the fluid pressure in the rear pressurizing chamber 98, whereby the operating force of the brake pedal 10 is boosted by the hydraulic booster 78. The force acting on the power piston 90 in its advancing direction based on the fluid pressure in the booster chamber 98 will be referred to as an "assisting force" where appropriate.

The pressure regulating portion 88 includes a pressure regulating piston 100, a spool 102 and a reaction applying device 104. The pressure regulating piston 100 partially defines a pressure regulating chamber 106 on its front side. The spool 102 functions to establish selective communication of the pressure regulating chamber 106 with the pump device 12 or a master reservoir 108, or disconnect the pressure regulating chamber 106 from both of the pump device 12 and the master reservoir 108. As a result, the fluid pressure in the pressure regulating chamber 106 is regulated to the level corresponding to the operating force of the brake pedal 10. The spool 102 is moved together with the pressure regulating piston 100.

A return spring 110 is disposed between the spool 102 and the housing 82, and a return spring 112 is disposed between the pressure regulating piston 100 and the pressurizing piston 84. The spool 102 is normally held in its fully retracted position (rightmost position as seen in the figure) under a biasing action of the return spring 110, while the pressurizing piston 84 is normally held in its fully retracted position under a biasing action of the return spring 112.

A preset load of the return spring 112 disposed between the pressurizing piston 84 and the pressure regulating piston 100 is larger than that of the return spring 110 disposed between the spool 102 and the housing 82, so that while a drive force acting on the pressurizing piston 84 in the advancing direction is smaller than the preset load of the return spring 112 and larger than that of the return spring 110, the pressurizing piston 84 is advanced so as to advance the pressure regulating piston 100 together with the spool 102. When the drive force acting on the pressurizing piston 84 becomes larger than the preset load of the return spring 112, the pressurizing piston 84 is advanced relative to the pressure regulating piston 100, so that the volume of the pressurizing chamber 86 is reduced.

The housing 82 has a plurality of ports 114–118 formed therein. Namely, the housing 82 has a high-pressure port 114 connected to the pump device 12, two low-pressure ports 115, 116 connected to the master reservoir 108, a brake-cylinder port 117 communicating with the booster chamber 98 and connected to the rear wheel brake cylinders 28, and a brake-cylinder port 118 communicating with the pressurizing chamber 86 and connected to the front wheel brake cylinders 20. The pressure regulating chamber 106 is connected through a fluid passage 120 to the booster chamber 98, so that the pressurized fluid which is delivered from the pump device 12 and the pressure of which is regulated by the pressure regulating portion 88 is supplied to the rear wheel brake cylinders 28 through the booster chamber 98. The pressurized fluid delivered from the pressurizing chamber 86 in response to an advancing movement of the pressurizing piston 84 is supplied to the front wheel brake cylinders 20.

A pressure chamber 122 is provided in communication with the fluid passage 120. As described below, the reaction-force applying device 104 is activated with the fluid pressure in the pressure chamber 122.

When the spool 102 is placed in its fully retracted position, the pressure regulating chamber 106 in front of the pressure regulating piston 100 is held in communication with the master reservoir 108 through the low-pressure port 115, so that the fluid pressure in the pressure regulating chamber 106 is at the atmospheric level, and the fluid pressure in the booster chamber 98 is accordingly at the atmospheric level.

When the spool 102 is advanced with an advancing movement of the pressure regulating piston 100, the pressure regulating chamber 106 is disconnected from the master reservoir 108 and communicated with the pump device 12 through the high-pressure port 114. As a result, the fluid pressure in the pressure regulating chamber 106 is raised, and the thus pressurized fluid is delivered from the pressure regulating chamber 106 to the booster chamber 98 through the fluid passage 120. Accordingly, the power piston 90 receives the assisting force in addition to the drive force based on the operating force of the brake pedal 10, and is advanced to advance the pressurizing piston 84. Thus, the operating force of the brake pedal 10 is boosted by the hydraulic booster 78, and the fluid pressure in the pressurizing chamber 86 is pressurized to a level corresponding to the boosted force (sum of the drive force and the assisting force). The pressure regulating piston 100 is eventually held at a position of equilibrium between a force which acts on the piston 100 in the advancing direction based on the fluid pressure in the pressurizing chamber 86, and a sum of a force which acts on the piston 100 in the retracting direction based on the fluid pressure in the pressure regulating chamber 106 and the biasing force of the return spring 110. Accordingly, the position of the spool 102 is determined, and the fluid pressure in the pressure regulating chamber 106 is regulated to a level corresponding to or determined by the operating force of the brake pedal 10 (hereinafter referred to as a "brake operating force" where appropriate).

As the force acting on the pressure regulating piston 100 in the advancing direction is increased, the fluid pressure in the pressure regulating chamber 106 is raised or increased, and the fluid pressure in the pressure chamber 122 is accordingly raised. As a result, a force based on the fluid pressure in the pressure chamber 122 acts on a reaction disc 124 of the reaction-force applying device 104 in the retracting direction, so that a reaction force is applied from the reaction disc 124 to the spool 102 through a reaction rod 126, and to the brake pedal 10 through the pressure regulating piston 100 and the pressurizing piston 84. As the brake operating force is increased, the reaction force received by the brake pedal 10 is accordingly increased, and the boosting ratio of the hydraulic booster 78 is reduced.

The pump device 12 includes an accumulator 134, a pump 136, an electric motor 138 for driving the pump 134, and a check valve 139. The pressurized fluid delivered from the pump device 12 is detected by a hydraulic pressure sensor 140. Namely, the pressure of the pressurized fluid stored in the accumulator 134 can be detected by the pressure sensor 140. In this embodiment, the electric motor 138 is controlled so as to hold the fluid pressure in the accumulator 134 within a predetermined range, so that the pressure in the accumulator 134 is held substantially within the predetermined range. The pump 136 may be a plunger pump or a gear pump.

A pressure relief valve 142 is provided in a fluid passage connecting the delivery and suction sides (high-pressure and low-pressure sides) of the pump 136. The pressure relief valve 142 functions to prevent an excessive rise of the pressure of the pressurized fluid delivered from the pump 136, that is, an excessive rise of the delivery pressure of the pump 136.

The second hydraulic pressure source 14 is arranged to deliver a pressurized fluid when the brake pedal 10 is operated or depressed. As the operating amount of the brake pedal 10 is increased, the power piston 90 and the pressurizing piston 84 are advanced to advance the pressure regulating piston 100 and the spool 102, so that the fluid pressure in the pressure regulating chamber 106 is increased by the pressurized fluid received from the pump device 12, and is regulated by the pressure regulating portion 88, to a level corresponding to the brake operating force. The pressurized fluid having the thus regulated pressure is supplied to the booster chamber 98. As a result, the pressurizing piston 84 is advanced by both the brake operating force and the assisting force based in the fluid pressure in the booster chamber 98, so that the fluid pressure in the pressurizing chamber 86 is increased. The fluid pressurized in the booster chamber 98 is supplied to the rear wheel brake cylinders 28, while the fluid pressurized in the pressurizing chamber 86 is supplied to the front wheel brake cylinders 20.

When the brake pedal 10 is released toward its non-operated position, the brake operating force acting on the pressurizing piston 84 is reduced, and the fluid pressure in the pressurizing chamber 86 is lowered. As a result, the pressure regulating piston 100 is retracted with the spool 102, and the pressure regulating chamber 106 is eventually communicated with the master reservoir 108, so that the fluid pressure in the chamber 106 is lowered. The fluid discharged from the front wheel brake cylinders 20 is returned to the master reservoir 108 through the pressurizing chamber 86, a center valve 144 and the low-pressure port 116.

To the pressurizing chamber 86, there are connected the front wheel brake cylinders 20 through a fluid passage 150. A solenoid-operated shut-off valve 152 (hereinafter referred to as a "master-cylinder shut-off valve 152", and represented by SMCF in the drawings) is provided in the fluid passage 150. The two front wheel brake cylinders 20 are connected to each other through a connecting passage 153 in which is provided a solenoid-operated shut-off valve 154 (hereinafter referred to as a "front communicating valve 154", and represented by SCF in the drawings). In the present embodiment, the fluid passage 150 functions as a main fluid passage connected to the second hydraulic pressure source 14, while the connecting passage 153 functions as a connecting passage connected to the main fluid passage and connecting the two front wheel brake cylinders 20 to each other. To a portion of the fluid passage 150 between the master-cylinder shut-off valve 152 and the brake-cylinder port 118, there is connected a stroke simulator 156 through a solenoid-operated shut-off valve 158 (hereinafter referred to as a "simulator shut-off valve 158", and represented by SCSS in the drawings). The stroke simulator 156 and the simulator shut-off valve 158 constitute a stroke simulator device 159.

To the booster chamber 98, there are connected the rear wheel brake cylinders 28 through a fluid passage 160. A solenoid-operated shut-off valve 162 (hereinafter referred to as a "master-cylinder shut-off valve 162", and represented by SMCR in the drawings) is provided in the fluid passage 160. The two rear wheel brake cylinders 28 are connected to each other through a connecting passage 163 in which is provided a solenoid-operated shut-off valve 164 (hereinafter referred to as a "front communicating valve 164", and represented by SCR in the drawings).

Each of the master-cylinder shut-off valves 152, 162 has a solenoid coil, and is placed in its closed state when the solenoid coil is energized. In the closed state, the corresponding wheel brake cylinder 20, 28 is disconnected from the second hydraulic pressure source 14. When the solenoid coil is de-energized, the master-cylinder shut-off valve 152, 162 is placed in its open state in which the corresponding wheel brake cylinder 20, 28 is communicated with the second hydraulic pressure source 14. The master-cylinder shut-off valves 152, 162 and the front and rear communicating valves 154, 164 are normally open valves, while the simulator shut-off valve is a normally closed valve.

To the pump device 12, there are connected the wheel brake cylinders 20, 28 through a fluid passage 170 in which is provided a pressure-increasing linear valve 172. Further, a pressure-reducing linear valve 176 is provided in a fluid passage 174 connecting the wheel brake cylinders 20, 28 and the master reservoir 108. These pressure-increasing and pressure-reducing linear valves 172, 176 constitute the linear valve device 30.

Figure 2:
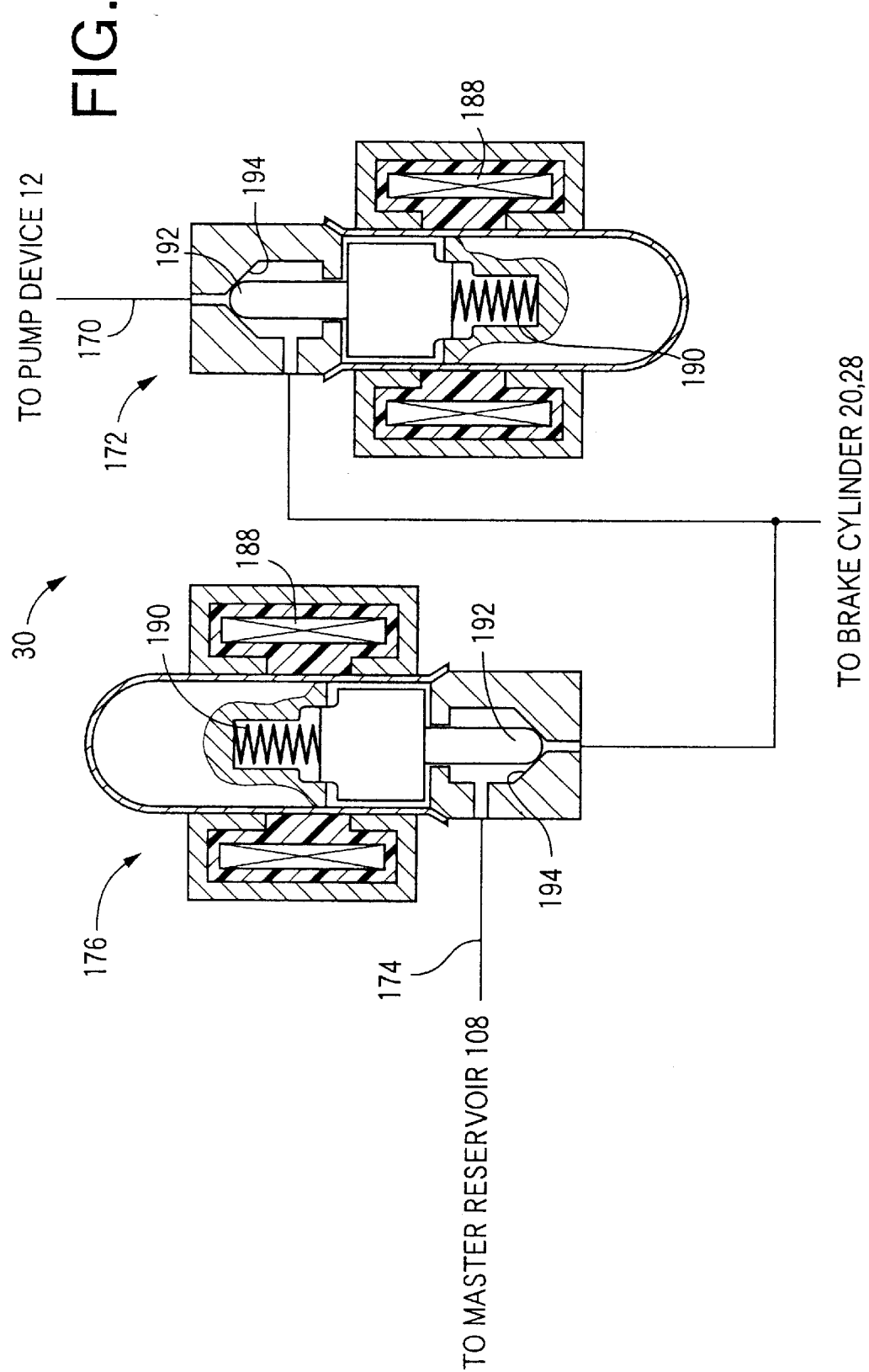
FIG. 2 is an elevational view partly in cross section of a linear valve device included in the braking pressure control apparatus of FIG. 1.

As shown in FIG. 2, the pressure-increasing and pressure-reducing linear valves 172, 176 are both normally closed valves, each of which is a seating valve including a solenoid having a coil 188, a spring 190, a valve member 192, and a valve seat 194.

When the coil 188 of the seating valve is in a de-energized state, a biasing force of the spring 190 acts on the valve member 192 in a valve-closing direction that causes the valve member 192 to be seated on the valve seat 194, while at the same time a force based on a pressure difference across the linear valve 172, 174 acts on the valve member 192 in a valve-opening direction that causes the valve member 192 to be moved away from the valve seat 194. When the force based on the pressure difference is larger than the biasing force of the spring 190, the valve member 192 is held apart from the valve seat 194, that is, the linear valve 172, 176 is placed in the open position.

When the coil 188 is energized with an electric current, an electromagnetic drive force acts on the valve member 192 in the valve-opening direction. A sum of this electromagnetic drive force and the force based on the pressure difference (hereinafter referred to as a "pressure-difference force") acts on the valve member 192 in the valve opening direction while the biasing force of the spring 190 acts on the valve member 192 in the valve-closing direction. The position of the valve member 192 relative to the valve seat 194 is determined by a relationship between the above-indicated sum and the biasing force of the spring 190. The electromagnetic force is increased with an increase in the amount of electric current to be applied to the coil 188.

When the electromagnetic force is increased with an increase of the amount of electric current applied to the coil 188, the force by which the valve member 192 has been forced against the valve seat 194 is reduced, so that the pressure-difference force required to move the valve member 192 from the valve seat 194 is accordingly reduced. The valve member 192 is moved apart from the valve seat 194 when the sum of the pressure-difference force and the electromagnetic force becomes larger than the biasing force of the spring 190. The lower limit of the pressure difference across the linear valve 172, 176 above which the valve member 192 is moved apart from the valve seat 194 is referred to as a "valve-opening pressure difference". The valve-opening pressure difference is reduced with an increase in the electromagnetic force, that is, with an increase in the amount of electric current to be applied to the coil 188. In the pressure-increasing linear valve 172, the pressure-difference force corresponds to a difference between the pressure of the pressurized fluid delivered from the pump device 12 (fluid pressure in the accumulator 134) and the fluid pressure in the wheel brake cylinder 20, 28. In the pressure-reducing valve 176, the pressure-difference force corresponds to a difference between the fluid pressure in the master reservoir 108 and the fluid pressure in the wheel brake cylinder 20, 28. In both of the pressure-increasing and pressure-reducing linear valves 172, 176, the pressures of the fluid to be delivered to the wheel brake cylinders 20, 28 can be controlled by controlling the electromagnetic forces generated by the respective linear valves 172, 176, that is, by controlling the amounts of electric current to be applied to the coils 188 of the respective linear valves 172, 176.

To a portion of the fluid passage 170 between the pressure-increasing linear valve 172 and the pump device 12, there is connected a hydraulic pressure sensor 196 provided for detecting the pressure of the pressurized fluid to be supplied to the pressure-increasing linear valve 172. The output signal of this pressure sensor 196 more accurately represents the pressure of the fluid as supplied to the linear valve 172, than that of the pressure sensor 140, since the pressure detected by the pressure sensor 196 reflects a pressure loss between the pump device 12 and the linear valve 172. Accordingly, the use of the output signal of the pressure sensor 196 assures improved accuracy of control of the linear valve device 30.

To the operating rod 94, there is connected a stroke simulator 200, which includes a spring 206 through which a pedal-side rod 202 and a booster-side rod 204 of the operating rod 94 engage each other such that the pedal-side rod 202 is movable relative to the booster-side rod 204.

In the present hydraulically operated braking system, the stroke simulator 156 is provided in the fluid passage 150, in addition to the stroke simulator 200. The stroke simulator 156 is a wet-type stroke simulator, as distinguished from the stroke simulator 200 which is a dry-type stroke simulator.

In the present hydraulically operated braking system, hydraulic pressure sensors 210 and 211 are provided for detecting the fluid pressures in the pressurizing chamber 86 and the booster chamber 98 of the second hydraulic pressure source 14, respectively, and hydraulic pressure sensors 212, 214, 216 and 218 are provided for detecting the fluid pressures in the respective wheel brake cylinders 20, 28. Two stroke sensors 220, 221 are provided for detecting the operating amount of the brake pedal 10, more specifically, the operating stroke of the brake pedal 10. Although the provision of the two stroke sensors 220, 221 is not essential, it assures an improved degree of accuracy of detection of the operating stroke of the brake pedal 10. The hydraulic pressure sensor 210 for detecting the fluid pressure in the pressurizing chamber 86 will be hereinafter referred to as a master-cylinder pressure sensor, while the hydraulic pressure sensor 211 for detecting the fluid pressure in the booster chamber 98 will be referred to as a booster pressure sensor. Although the fluid pressure in the pressurizing chamber 86 (hereinafter referred to as "master cylinder pressure") and the fluid pressure in the booster chamber 98 (hereinafter referred to as "booster pressure") are not necessarily exactly equal to each other, these master cylinder pressure and the booster pressure correspond to the brake operating force, and are considered to be equal to each other in the present embodiment.

The output signals of the four sensors, namely, the master-cylinder pressure 210, booster pressure sensor 211 and the two stroke sensors 220, 221 are used to obtain a desired vehicle braking torque or force. However, the use of these four sensors is not essential, and the desired vehicle braking torque may be obtained on the basis of the output signal of a single pedal force sensor providing for detecting the operating force of the brake pedal 10.

The present braking system further uses: a brake switch or stop switch 224 for detecting an operation or a depressing action of the brake pedal 10; wheel speed sensors 226 for detecting the rotating speeds of the wheels 16, 24; a vehicle speed sensor 227 for detecting a running speed of the vehicle; and an operating-state detecting device 228 for detecting the operating states of manually operated members provided on a control panel, for instance.

The slipping state or tendency of each wheel 16, 24 can be detected on the basis of the output signal of the corresponding wheel speed sensor 226. The operating states of the manually operated members on the control panel can be detected by the output signals of the operating-state detecting device 228. The manually operated members include a braking-effect control selector switch which is turned on by the vehicle operator when the operator desires to control the braking system in a braking-effect control mode in which the vehicle braking force is controlled on the basis of a detected actual braking effect, which may be represented by the detected deceleration value of the vehicle, for example.

The present braking system is controlled by the ECU 32, which is principally constituted by a computer incorporating a central processing unit (CPU) 240, a random-access memory (RAM) 242, a read-only memory (ROM) 244, an input portion 246 and an output portion 248. To the input portion 246, there are connected the above-indicated hydraulic pressure sensors 140, 196, 210, 211, 212–218, stroke sensors 220, 221, stop switch 224, wheel speed sensors 226, vehicle speed sensor 227, and operating-state detecting device 228. To the output portion 248, there are connected control circuits for controlling the solenoid coils of the above-indicated solenoid-operated shut-off valves 152, 154, 158, 162, 164 and the solenoid coils 188 of the linear valve devices 30, and an alarming device 252. The ROM 244 stores various control programs for executing a braking pressure control routine illustrated in the flow chart of FIG. 3, a pressure-sensor diagnosing routine illustrated in the flow chart of FIG. 10, a simulator shut-off valve diagnosing routine illustrated in the flow chart of FIG. 12, a data table of FIGS. 7 and 8 indicating various remedies for dealing with various abnormalities of the second hydraulic system 282, data tables of FIGS. 4–6 used for determining the desired vehicle braking force. The ROM 244 stores other control programs and data tables including a switching program for selectively placing the braking system in the first control mode or the second control mode, an anti-lock braking control program for effecting the anti-lock braking control, a vehicle turning stability control program for effecting a vehicle turning stability control, a cooperative braking control program for effecting a cooperative braking control, and a linear valve device control program for controlling the linear valve devices 30. In the cooperative braking control, the vehicle is braked by a regenerative braking torque generated by a motor generator (not shown), as well as a hydraulic braking torque generated by the present braking system. The linear valve devices 30 are controlled so that the actual fluid pressure in each wheel brake cylinder 20, 28 coincides with a desired value, in a feedback fashion on the basis of the detected wheel brake cylinder pressure.

In the braking system constructed according to the present embodiment of this invention, the pump device 12, linear valve devices 30, fluid passage 170 and wheel brake cylinders 20, 28 cooperate to constitute a major portion of a first hydraulic system 280, while the second hydraulic pressure source 14, fluid passages 150, 160, master-cylinder shut-off valves 152, 162, wheel brake cylinders 20, 28, stroke simulator device 159, stroke sensors 220, 221, stop switch 224, master-cylinder pressure sensor 210 and booster pressure sensor 211 cooperate to constitute a major portion of a second hydraulic system 282. The first hydraulic system 280 may be called a dynamic system, while the second hydraulic system 282 may be called a static system.

The linear valve devices 30 and the master-cylinder shut-off valves 152, 162 constitute a switching device for switching the control mode of the braking system between the first control mode in which the first hydraulic system 280 is activated and the second control mode in which the second hydraulic system 282 is activated. It is also noted that the pump device 12 of the first hydraulic system 280 is used also for the second hydraulic pressure source 14. In the present embodiment, the linear valve devices 30 are controlled depending upon the operating state of the second hydraulic system 282.

An operation of the hydraulically operated braking system constructed as described above will be described.

In the first control mode of the braking system, the master-cylinder shut-off valves 152, 162 are placed in the closed state, so that the wheel brake cylinders 20, 28 are disconnected from the second hydraulic pressure source 14. Further, the front and rear communicating valves 154, 164 are placed in the closed state, while the simulator shut-off valve 158 is placed in the open state. In this first control mode, the amounts of electric current to be applied to the coils 188 of each linear valve device 30 are controlled to control the pressure of the pressurized fluid delivered from the pump 12, for thereby controlling the fluid pressure in each wheel brake cylinder 20, 28.

In the second control mode of the braking system, the master-cylinder shut-off valves 152, 162 are placed in the open state, while the front and rear communicating valves 154, 164 are placed in the open state, so that the wheel brake cylinders 20, 28 are communicated with the second hydraulic pressure source 14. In this second control mode, a pressurized fluid is delivered from the second hydraulic pressure source 14 to the wheel brake cylinders 20, 24 of the brakes 18, 26, in response to an operation of the brake pedal 10.

In the second control mode, the simulator shut-off valve 158 is placed in the closed state, so that the stroke simulator 156 is disconnected from the second hydraulic pressure source 14, to prevent an unnecessary flow of the pressurized fluid into the stroke simulator 156, for thereby avoiding an unnecessary consumption of the pressurized fluid delivered from the second hydraulic pressure source 14. In addition, the coils 188 of the linear valve devices 30 are held in the de-energized state, and the pressure-increasing and pressure-reducing valves 172, 176 of each linear valve device 30 are held in the closed state, so that the wheel brake cylinders 20, 28 are disconnected from the pump device 12.

In the second hydraulic pressure source 14 of the braking system placed in the second control mode, the hydraulic booster 78 is activated with the pressurized fluid delivered from the pump device 12. If the pressurized fluid is not supplied from the pump device 12 to the hydraulic booster 78 due to any abnormality or defect of the pump device 12, for instance, the hydraulic booster 78 is not operable. In this event, the second hydraulic pressure source 14 functions simply as the master cylinder 80. Namely, the pressurizing piston 84 is advanced by only the brake operating force received from the brake pedal 10, without the assisting force acting on the pressurizing piston 84. The fluid pressurized in the pressurizing chamber 86 is delivered to the front wheel brake cylinders 20 for activating the front brakes 18.

Normally, the braking system is placed in the first control mode, and is controlled in the braking-effect control mode, in which the vehicle braking force desired by the vehicle operator is obtained on the basis of the output signals of the stroke sensors 220, 221, master-cylinder pressure sensor 210 and the booster pressure sensor 211, and the amounts of electric current to be applied to the coils 188 of the linear valve devices 30 are controlled so that the actual fluid pressure in each wheel brake cylinder 20, 28 coincides with a desired value corresponding to the obtained desired vehicle braking force.

The braking system is switched to the second control mode when the braking-effect control selector switch on the control panel or any other appropriate manually operable member is turned on to switch the control mode of the braking system from the first control mode to the second control mode.

The control mode of the present braking system may be switched between the first and second control modes, depending upon whether the first and second hydraulic systems 280, 282 are normally functioning or not. The second hydraulic system 282 includes the detecting device for detecting the operating state of the brake pedal 10, that is, the stroke sensors 220, 221, master-cylinder pressure sensor 210, booster pressure sensor 211, etc. However, the output signals of the detecting device are used in the first control mode, for controlling the fluid pressure in the wheel brake cylinders 20, 28. Accordingly, the braking system may be switched to the second control mode when the second hydraulic system 282 is abnormal due to an abnormality or defect of the detecting device. Thus, the control mode is switched from the first control mode to the second control mode, when it is impossible or difficult to control the fluid pressure in the wheel brake cylinders 20, 28 due to some abnormality while the braking system is placed in the first control mode. Where a portion of the detecting device is abnormal but the other normal portion of the detecting device can be substituted for the abnormal portion, the braking system may be held placed in the first control mode in which the first hydraulic system 280 is controlled on the basis of the output signals of the normal portion of the detecting device.

Where the vehicle on which the present braking system is used includes an electric motor functioning as a vehicle drive power source, the braking system is capable of effecting the above-indicated cooperative braking control in which the hydraulic braking force produced by the present braking system is controlled so that a sum of the regenerative braking force produced by the electric motor and the hydraulic braking force coincides with the vehicle operator's desired vehicle braking force. The cooperative braking control is effected when the operating speed of the electric motor is higher than a predetermined lower limit and when the amount of electric energy stored or left in a battery for the electric motor is larger than a predetermined upper limit (when the amount of electric energy that can be stored in the battery during the regenerative braking operation of the electric motor is smaller than a predetermined lower limit). The cooperative braking control is terminated when the operating speed of the electric motor falls below the lower limit, or when the amount of electric energy stored in the battery has exceeded the upper limit. When the amount of electric energy in the battery is larger than the upper limit, there is a risk of excessive charging of the battery by the electric motor. The cooperative braking control is effected while the braking system is placed in the first control mode. When the condition for terminating the cooperative braking control indicated above is satisfied, or when it becomes difficult to obtain the required hydraulic braking force in the first control mode, the control mode of the braking system is changed from the first control mode to the second control mode.

First, the operation of the braking system in the first control mode will be briefly described.

In the first control mode, the fluid pressure in the wheel brake cylinders 20, 28 is controlled by controlling the linear valve devices 30. In the present embodiment, the braking system is controlled in the braking-effect control mode in the first control mode. Initially, an operator's desired fluid pressure P* in the wheel brake cylinders 20, 28 is determined on the basis of the detected operating stroke and operating force of the brake pedal 10. The operating stroke is detected on the basis of an average S of the stroke values represented by the output signals of the two stroke sensors 220, 221, while the operating force is detected on the basis of an average of pressure values $P_M$ and $P_B$ represented by the master-cylinder pressure sensor 210 and the booster pressure sensor 211. The desired fluid pressure P* (desired wheel brake cylinder pressure P*) is calculated according to the following equation (1):

$$P^* = K \cdot G \tag{1}$$

In the above equation (1), "G" represents a desired deceleration value of the vehicle, which is represented by the following equation (2);

$$G = \alpha \cdot Gpt + (1-\alpha) \cdot Gst \tag{2}$$

Figure 4:
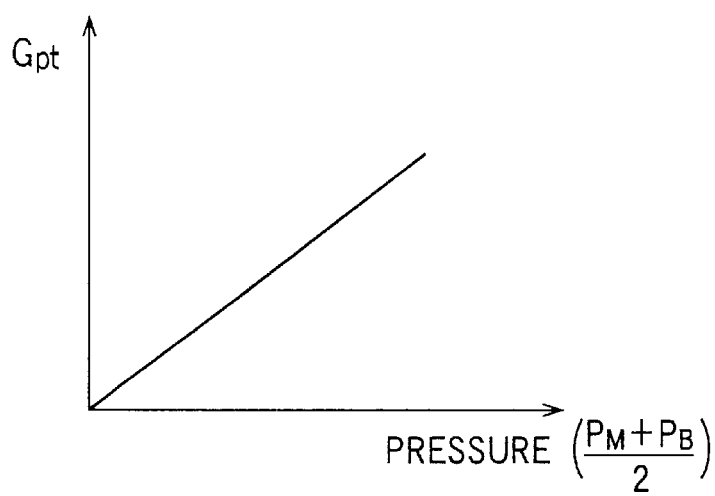
FIG. 4 is a graph indicating a relationship between a hydraulic pressure of a first hydraulic pressure source and a desired braking force corresponding to a brake operating force, which relationship is represented by a data table stored in the ROM.
Figure 5:
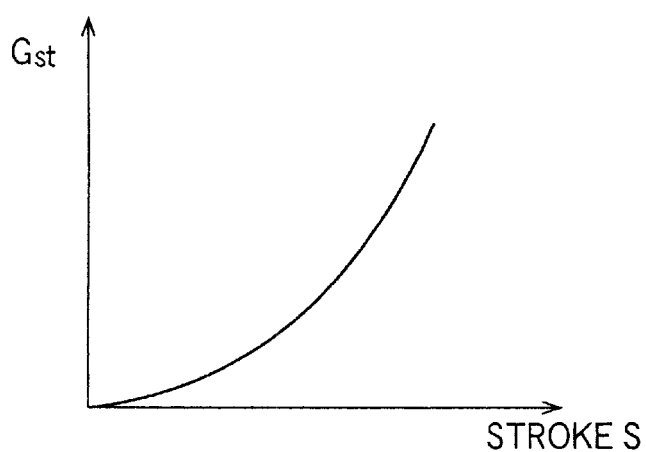
FIG. 5 is a graph indicating a relationship between a brake operating stroke and a desired braking force corresponding to the brake operating stroke, which relationship is represented by a data table stored in the ROM.
Figure 6:
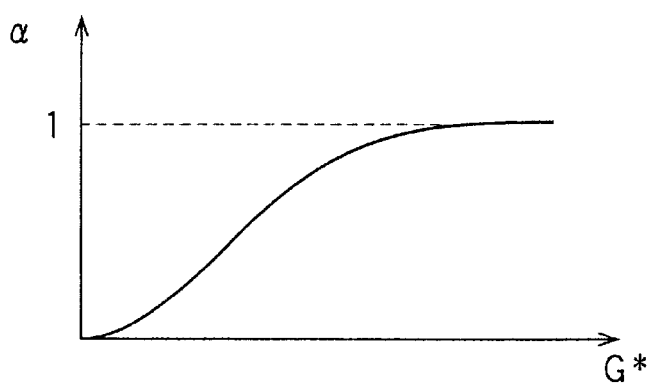
FIG. 6 is a graph indicating a relationship between a desired braking force in the last control cycle and a ratio of vehicle deceleration values corresponding to the brake operating stroke and force, which relationship is represented by a data table stored in the ROM.

It will be understood from the above equation (1) that the desired wheel brake cylinder pressure P* is proportional to the desired vehicle deceleration value G. It will be understood from the above equation (2) that the desired vehicle deceleration value G is determined by a desired deceleration value Gpt which corresponds to the brake operating force, and a desired deceleration value Gst which corresponds to the brake operating stroke. The desired deceleration value Gpt is determined on the basis of the hydraulic pressure $(P_M+P_B)/2$ corresponding to the brake operating force, and according to a predetermined relationship between the value Gpt and the hydraulic pressure $(P_M+P_B)/2$, as indicated in the graph of FIG. 4. This relationship is represented by a data table stored in the ROM 244. As indicated in FIG. 4, the value Gpt increases with an increase in the hydraulic pressure $(P_M+P_B)/2$. Similarly, the desired deceleration value Gst is determined on the basis of the brake operating stroke S, and according to a predetermined relationship between the value Gst and the operating stroke S, as indicated in the graph of FIG. 5. This relationship is represented by a data table stored in the ROM 244. As indicated in FIG. 5, the value Gst increases with an increase in the brake operating stroke S. In the above equation (1), "K" represents a predetermined coefficient, and "α" represents a weight of the deceleration value corresponding to the brake operating stroke with respect to the deceleration value corresponding to the brake operating force. This ratio α is determined by the desired vehicle deceleration value G* used in the last control cycle, and according to a predetermined relationship between the ratio α and the deceleration value G*, as indicated in the graph of FIG. 6. This relationship is represented by a data table stored in the ROM 244. As indicated in FIG. 6, the ratio α increases with an increase in the last value G*.

The amounts of electric current to be applied to the coils 188 of the linear valve devices 30 are controlled so that the actual wheel brake cylinder pressure coincides with the determined desired value P*. When the braking system is placed in the first control mode, the wheel brake cylinder pressure is controlled according to the braking pressure control routine illustrated in the flow chart of FIG. 3.

Figure 3:
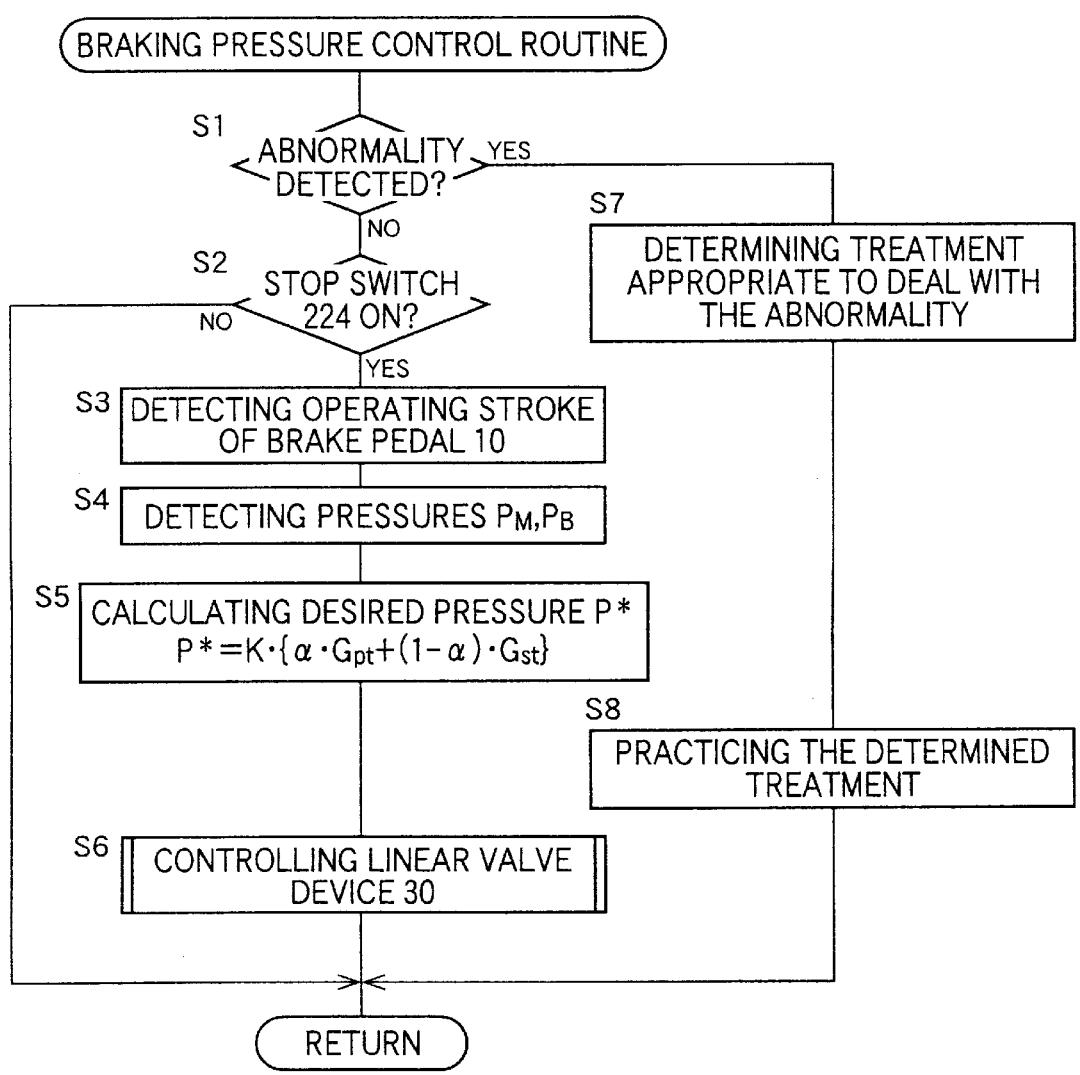
FIG. 3 is a flow chart illustrating a braking pressure control routine executed according to a control program stored in a ROM of the braking pressure control apparatus.

The braking pressure control routine of FIG. 3 is initiated with step S1 to determine whether any abnormality of the second hydraulic system 282 has been detected. If any abnormality has been detected (and an abnormality-processing control mode is not established), a negative decision (NO) is obtained in step S1, and the control flow goes to step S2 to determine whether the stop switch 224 is in the ON state. If the brake pedal 10 is in operation and the stop switch 244 is in the ON state, an affirmative decision (YES) is obtained in step S2, and the control flow goes to sep S3 to detect the operating stroke of the brake pedal 10, and then to step S4 to detect the master-cylinder pressure PM and the booster pressure PB. Step S4 is followed by step S5 in which the desired wheel brake cylinder pressure P* is calculated according to the above equations (1) and (2). Then, the control flow goes to step S6 in which the linear valve devices 30 are controlled.

If the abnormality-processing control mode is established, an affirmative decision (YES) is obtained in step S1, and the control flow goes to step S7 to determine a treatment appropriate for dealing with the abnormality, and then to step S8 to practice the determined treatment. In the present embodiment, the ROM 244 stores a data table which indicates various treatments for dealing with various kinds of abnormalities of the second hydraulic system 282. According to this data table, an appropriate treatment for dealing with the particular abnormality of the second hydraulic system 282 is determined.

While the present embodiment is adapted such that the hydraulic pressure corresponding to the brake operating force is determined to be an average of the master-cylinder pressure $P_M$ and the booster pressure $P_B$, the use of the average value is not essential. Namely, the master-cylinder pressure $P_M$ or the booster pressure PB may be used as the hydraulic pressure corresponding to the brake operating force. Further, the desired wheel brake cylinder pressure P* may be calculated according to the following equation (3), rather than the above equation (1):

$$P^* = f_s(S, 1/S^2) + f_m\{P, 1-(1/P^2)\} \qquad (3)$$

In the above equation (3), $f_s$ and $f_m$ are functions. Where the desired wheel brake cylinder pressure P* is determined according to the above equation (3), the weight of the deceleration value corresponding to the brake operating stroke S is increased with a decrease in the brake operating stroke S, and the weight of the hydraulic pressure P corresponding to the brake operating force is increased with an increase with the hydraulic pressure P.

As indicated in FIGS. 7 and 8, the second hydraulic system 282 is diagnosed for any abnormality, on the basis of the output signals of the stop switch 224, stroke sensors 220, 221, master-cylinder pressure sensor 210, booster pressure sensor 211, and accumulator pressure sensors 140, 196. The brake operating stroke S is detected on the basis of the output signals of the two stroke sensors 220, 221. For instance, the brake operating stroke S is determined to be an average of the values represented by the output signals of the two stroke sensors 220, 221. Similarly, the pressure of the second hydraulic pressure source 14 may be determined to be an average of the values represented by the output signals of the master-cylinder pressure sensor 210 and the booster pressure sensor 211, and the pressure of the accumulator 134 may be determined to be an average of the values represented by the output signals of the two accumulator pressure sensors 140, 196. However, the ratio of the values represented by the output signals of the two sensors as well as the values may be taken into account in determining the brake operating stroke and the pressures of the second hydraulic pressure source 14 and the accumulator 134.

In FIGS. 7 and 8, "NORMAL OUTPUTS" mean that the output signals of the appropriate two sensors are both normal, and "ABNORMAL OUTPUTS" and "NO OUTPUTS" mean that at least one of the output signals of the appropriate two sensors is abnormal or zero. In the following description, the master-cylinder pressure and the booster pressure will be collectively referred to as "pressure of the second hydraulic pressure source 14", unless the master-cylinder pressure and the booster pressure are required to be distinguished from each other.

As indicated in FIGS. 7A–7C, the second hydraulic system 282 is diagnosed to be normal if an operating stroke of the brake pedal 10 is detected and if the pressure of the second hydraulic pressure source 14 and the pressure of the accumulator 134 are both normal, while the stop switch 224 is placed in the ON state. This state is referred to as a state (A). In this state (A), the second hydraulic pressure source 14 including the hydraulic booster 78 and the master cylinder 80 is normally functioning in response to an operation of the brake pedal 10.

Similarly, the second hydraulic system 282 is diagnosed to be normal if an operating stroke of the brake pedal 10 is not detected and if the pressure of the second hydraulic pressure source 14 is zero, even if the pressure of the accumulator 134 is held within a normal range, while the stop switch 224 is placed in the OFF state. This state is referred to as a state (O). In this state (O) wherein the brake pedal 10 is not in operation, neither an operating stroke of the brake pedal 10 nor a pressure of the second hydraulic pressure source 14 is detected.

When the second hydraulic system 282 is diagnosed to be normal, the braking system is kept controlled in the first control mode. The present invention does not directly relate to an abnormality of the linear valve devices 30, and a description on the diagnosis of the linear valve devices 30 is dispensed with. However, it is noted that the control mode of the braking system may be switched from the first control mode to the second control mode when any abnormality of the linear valve devices 30 is detected.

On the other hand, the second hydraulic system 282 is diagnosed to have some abnormality which cannot be identified, if the pressure of the accumulator 134 is abnormal even if an operating stroke of the brake pedal 10 is detected and the pressure of the second hydraulic pressure source 14 is normal, while the stop switch 224 is in the ON state. This state is referred to as a state (B). Where the pressure of the accumulator 134 is abnormally low, the booster pressure detected by the booster-pressure sensor 211 must be abnormally low. In this sense, the state (B) wherein the pressure of the accumulator 134 is normal does not theoretically exist. Accordingly, the second hydraulic system 282 is diagnosed to have some abnormality that cannot be identified, and the braking system is brought into an "impossible-to-diagnose mode". That is, the control of the braking system in the first control mode is terminated, and the control state is switched to the second control mode. In the second control mode, either, the brake operating force cannot be boosted by the hydraulic booster 78 since the pressure of the accumulator 134 is abnormally low, but the wheel brake cylinders 20 can be activated by the brake operating force, for operating the front wheel brakes 188.

In the state (B) wherein there exists an abnormality that cannot be identified, it is impossible to correctly diagnose the second hydraulic system 282. In this state, the braking system is brought into the "impossible-to-diagnose" mode described above. This mode is also established in other states, namely, in states (F), (J) and (N) indicated in FIGS. 7A–7C. In the sate (F), the brake operating stroke and the pressure of the accumulator 134 are both normal even if the pressure of the second hydraulic pressure source 14 is normal, while the stop switch 224 is placed in the ON state.

In the state (J), a brake operating stroke is detected, the pressure of the hydraulic pressure source 14 is normal and the pressure of the accumulator 134 is abnormal, even if the stop switch 224 is placed in the OFF state. In the state (N), the pressure of the second hydraulic pressure source 14 is normal even if the brake operating stroke and the pressure of the accumulator 134 are abnormal, while the stop switch 224 is in the OFF state.

The pump device 12 is diagnosed to be abnormal, if neither the pressure of the second hydraulic pressure source 14 nor the pressure of the accumulator 134 is normal even if the brake operating stroke is normal, while the stop switch 224 is in the ON state. This state is referred to as a state (D). In this state wherein the pressure of the accumulator 134 is abnormally low, a the second hydraulic pressure source 14 is not likely to be able to deliver the pressurized fluid having a normal pressure level, when the brake pedal 10 is operated. In this state (D), the control mode of the braking system is switched to the second control mode.

The pump device 12 is also diagnosed to be abnormal, if neither the pressure of the second hydraulic pressure source 14 nor the pressure of the accumulator 134 is normal even if the brake operating stroke is normal, while the stop switch 224 is placed in the OFF state. This state is referred to as a state (L). In this state, the pressure of the second hydraulic pressure source 14 can be considered to be abnormal since the pressure of the accumulator 134 is abnormally low, and the booster 78 is not able to normally function. Namely, the plump device 12 is considered to be abnormal. In the state (L), at least one of the stroke sensors 220, 221 and the stop switch 224 may be abnormal. In this case, however, it is impossible to determine which one of the sensors 220, 221 and stop switch 224 is abnormal. Since it is not possible to determine whether the brake pedal 10 has been operated, in the above case, the pump device 12 is diagnosed to be abnormal. The abnormal state (L) may be treated similarly to the above-indicated states (B), (F), (J) and (L) in which it is impossible to diagnose the second hydraulic system 282.

The pump device 12 is also diagnosed to be abnormal, if a brake operating stroke is not detected and if neither the pressure of the second hydraulic pressure source 14 and the pressure of the accumulator 134 is normal, while the stop switch 224 is in the OFF state. This state is referred to as a state (P).

The pump device 12 and the stop switch 224 are diagnosed to be abnormal, if a brake operating stroke is not detected, and if neither the pressure of the second hydraulic pressure source 14 nor the pressure of the accumulator 134 is normal, even if the stop switch 224 is detected to be in the ON state. This state is referred to as a state (H). In this state, there is an extremely low possibility that the brake pedal 10 is in operation.

The second hydraulic pressure source 14 is diagnosed to be abnormal, if the pressure of the second hydraulic pressure source 14 is abnormal even if a brake operating stroke is detected and the pressure of the accumulator 134 is in the normal range, while the stop switch 224 is placed in the ON state. This state is referred to as a state (C), which will be further described.

The stroke sensors 220, 221 are diagnosed to be abnormal, if the brake operating stroke is abnormal even if the pressures of the second hydraulic pressure source 14 and the accumulator 134 are both normal, while the stop switch 224 is in the ON state. This state is referred to as a sate (E). In this state, the braking system is brought into an abnormal-stroke-sensor mode. Namely, the braking system is kept in the first control mode, but the detected brake operating stroke is not used to determine or calculate the desired pressure P* of the wheel brake cylinders 20, 28. In this case, the desired wheel brake cylinder pressure P* is determined on the basis of the pressure of the second hydraulic pressure source 14. That is, the brake operating stroke S in the above equation (2) is zeroed, and the weight "α" is set to be "1".

The stroke sensors 220, 221 are also diagnosed to be abnormal, if the pressure of the accumulator 134 is normal and if a pressure of the second hydraulic pressure source 14 is not detected even if a brake operating stroke is detected, while the stop switch 224 is in the OFF state. This state is referred to as a state (K). In this state, the braking system is brought to the abnormal-stroke-sensor mode, as in the state (E) described above.

The stop switch 224 is diagnosed to be abnormal, if a brake operating stroke is not detected and if the pressure of the accumulator 134 is normal, even if the stop switch 224 is detected to be placed in the ON state. This state is referred to as a state (G). In this state, the braking system is brought into an abnormal-stop-switch mode, in which the braking system is kept controlled in the first control state, without depending upon the operating state of the stop switch 224. Described in detail, the control flow goes to step S3 while skipping step S2, when the negative decision (NO) is obtained in step S1 in the braking pressure control routine of FIG. 3. While the brake pedal 10 is not in operation, the brake operating stroke and the pressure of the second hydraulic pressure source 14 are both zero, and the desired wheel brake cylinder pressure P* is also zero, so that the braking system is not activated to apply an unnecessary hydraulic brake to the vehicle. It is noted that a determination as to whether the brake pedal 10 is in operation may be effected on the basis of the output signals of the stroke sensors 220, 221 or the output signal of the master-cylinder pressure sensor 210 or booster pressure sensor 211, in place of the output signal of the stop switch 224. An operation of the brake pedal 10 can be detected by determining whether the detected operating stroke is larger than a predetermined threshold or whether the master cylinder pressure is higher than a predetermined threshold. In any event, the control of the braking system in the first control mode is continued in the above state (G).

The stop switch 224 is diagnosed to be abnormal if the brake operating stroke, and the pressures of the second hydraulic pressure source 14 and the accumulator 134 are all normal, even if the stop switch 224 is detected to be in the OFF state. This state is referred to as a state (I). In this state, the braking system is brought into the abnormal-stop-switch mode, as in the above state (G).

The stop switch 224 and the stroke sensors 220, 221 are both diagnosed to be abnormal, if the pressure of the accumulator 134 is normal even if the stop switch 224 is in the OFF state and a brake operating stroke is not detected. This state is referred to as a state (M). In this state, it is reasonable to consider that the second hydraulic pressure source 14 is operated to generate a normal pressure in response to an operation of the brake pedal 10 while the accumulator pressure is in the normal range. The pressure of the second hydraulic pressure source 14 is detected based on the output signals of the two pressure sensors 210, 211, and the pressure of the accumulator 134 is also detected based on the output signals of the two stroke sensors 220, 221, so that the accuracy of diagnosis of those pressures is comparatively high. To the contrary, the operation of the brake pedal 10 is detected based on the output signal of only one stop switch 224. Accordingly, the stop switch 224, and the stroke sensors 220, 221 whose output signals do not match the output signals of the pressures of the second hydraulic pressure source 14 and the accumulator 134 are diagnosed to be abnormal, in the above state (M). In this case, the braking system is brought into an abnormal-stop-switch, abnormal-stroke-sensor mode, in which the braking system is controlled in the first control mode, without depending upon the output signal of the stop switch 224, and according to the desired wheel brake cylinder pressure P* determined on the basis of the pressure of the second hydraulic pressure source 14. Namely, the brake operating stroke S used in step S5 is zeroed, and the weight "α" is set to "1".

The abnormal state (C) indicated above will be described in detail.

The state (C) is detected on the basis of the output signals of the two pressure sensors 210, 211 (master-cylinder pressure sensor 210 and booster pressure sensor 211). As 10 described above, the master-cylinder pressure sensor 210 is provided to detect the fluid pressure in the pressurizing chamber 86, while the booster pressure sensor 211 is provided to detect the fluid pressure in the booster chamber 98. Theoretically, the fluid pressure in the pressurizing chamber 98 is equal to the fluid pressure in the booster chamber 98, as indicated in FIG. 9A, as long as the pump device 12 and the second hydraulic pressure source 14 are normal. In FIG. 9A, "AA" represents a pulsation of the pressure of the pressurized fluid as detected by the master-cylinder pressure sensor 210 upon initiation of an operation of the pressure regulating portion 88 of the second hydraulic pressure source 14. Except for this pressure pulsation, the fluid pressures as detected by the two pressure sensors 210, 211 are equal to each other.

Where the pump device 12 or the pressure regulating portion 88 is abnormal, for instance, on the other hand, the pressures as detected by the two pressure sensors 210, 211 are not equal to each other. As indicated in FIG. 9B, the fluid pressures in the pressurizing and booster chambers 86, 98 are both lowered, but the fluid pressure in the booster chamber 98 is lowered down to a level which is almost zero, but the fluid pressure in the pressurizing chamber 86 is not lowered below a level corresponding to the brake operating force. Where the fluid pressure in the pressurizing chamber 98 is lowered (not down to zero) while the fluid pressure in the booster chamber 98 is zero, therefore, the hydraulic booster 78 can be diagnosed to be abnormal. This state is referred to as a state (C1), as indicated in FIG. 8. An example of this state (C1) is a case where the spool 100 of the pressure regulating portion 88 is not movable. Where the fluid pressure in the pressurizing chamber 98 is also zero, the cup of the pressurizing piston 84 may be considered defective. This state is referred to as a state (C2), as indicated in FIG. 8. The pressure regulating portion 88 is arranged to regulate the pressure of the pressurized fluid received from the accumulator 134, to a value corresponding to the fluid pressure in the pressurizing chamber 86. If the fluid in the pressurizing chamber 86 cannot be pressurized due to a damage of the cup of the pressurizing piston 84, the pressure of the fluid regulated by the pressure regulating portion 88 is extremely low. Where the pressurization of the fluid in the booster chamber 98 is detected while that in the pressurizing chamber 86 is not detected, there appears to be some abnormality that cannot be identified. This state is referred to as a state (C3), as also indicated in FIG. 8.

When the abnormal state (C1) is detected, the braking system is brought into an abnormal-pressure-regulating-portion mode, in which the control of the braking system in the first control mode is continued, and the desired wheel brake cylinder pressure P* is determined on the basis of the output signals of the stroke sensors 220, 221, without depending on the output signals of the master-cylinder pressure 210 and the booster pressure sensor 211. In the above equation (2), the weight "α" is zeroed. When the abnormal state (C2) is detected, the braking system is brought into an abnormal-piston mode, in which the control in the first control mode is continued. In these states (C1) and (C2) wherein the pump device 12 is normal, the braking system can be continuously controlled in the first control mode. Where the abnormal state (C3) is detected, the braking system is brought into the impossible-to-diagnose mode, namely, is switched to the second control mode.

As described above, the present embodiment is arranged not to switch the braking system to the second control mode, but to hold the braking system in the first control mode, as much as possible, where the second hydraulic pressure source 14 is diagnosed to be abnormal. Namely, the braking system is operated in the braking-effect control mode as long as the braking-effect control is possible in the presence of an abnormality of the second hydraulic pressure source 14. This arrangement permits an improved degree of controllability of the vehicle braking force. Where an abnormality of the second hydraulic pressure source 14 is detected while the braking system is placed in the cooperative braking control mode, the cooperative braking control is not terminated immediately after the detection of the abnormality of the hydraulic braking system. Where the pump device 12 is normal, the control of the braking system in the first control state can be continued even in the presence of some abnormality of the second hydraulic pressure source 14. Accordingly, the braking system is kept in the first control mode, to control the hydraulic braking force based on the pressurized fluid stored in the accumulator 134, with high accuracy.

It is also noted that the two pressure sensors 210 and 211 are provided to detect the fluid pressures in the respective two fluid chambers 86, 98. This arrangement permits an intricate diagnosis of the second hydraulic pressure source 14 for any abnormality at a specific location or portion thereof. Where the diagnosis is effected on the basis of an average of the two values represented by the two pressure sensors 210, 211, or on the basis of one of these two values, the second hydraulic pressure source 14 can be diagnosed to be abnormal, but the abnormality cannot be identified. Where the diagnosis is effected on the basis of the two values represented by the two hydraulic pressure sensors, a detected abnormality can be identified.

Although the present braking system is adapted to switch the control mode from the first mode to the second mode where a detected abnormality cannot be identified, as in the states (B), (F), (J) and (N), the braking system can be kept in the first control mode as long as the pressure of the fluid in the accumulator 134 is higher than a predetermined threshold.

Figure 10:
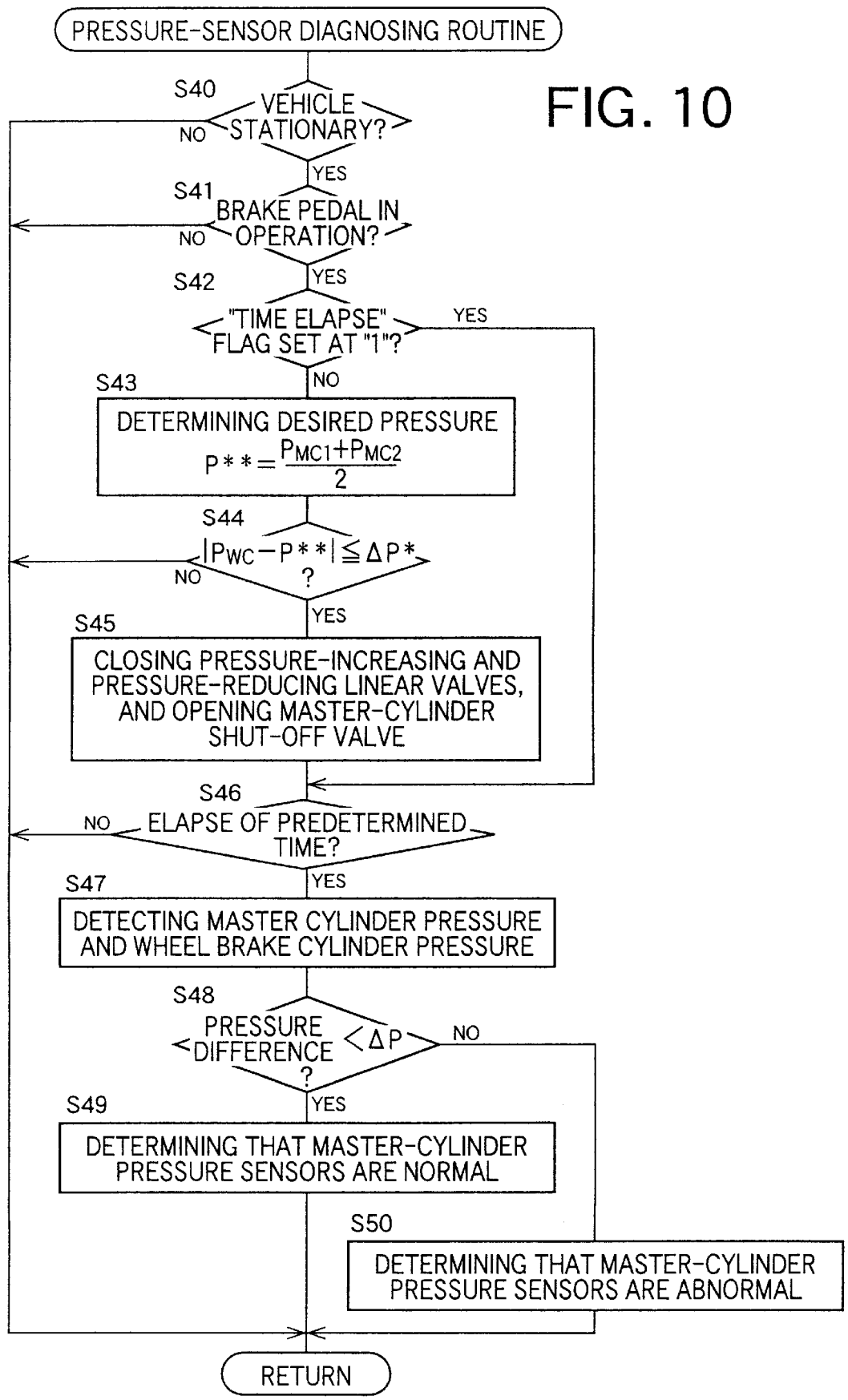
FIG. 10 is a flow chart illustrating a pressure-sensor diagnosing routine executed according to a control program stored in the ROM of the braking pressure control apparatus.

The master-cylinder pressure sensor 210 and the booster pressure sensor 211 are diagnosed for any abnormality, according to a pressure-sensor diagnosing routine illustrated in the flow chart of FIG. 10. This routine is executed in this embodiment while the vehicle is stationary.

The pressure-sensor diagnosing routine of FIG. 10 is initiated with step S40 to determine whether the vehicle is stationary. This determination is made by determining whether the vehicle running speed is lower than a predetermined threshold. If an affirmative decision (YES) is obtained in step S40, the control flow goes to step S41 to determine whether the brake pedal 10 is in operation. In the present embodiment, the determination in step S41 is made on the basis of the output signals of the stop switch 224 and the stroke sensors 210, 211. If the stop switch 224 is in the ON state, and the average of the values represented by the output signals of the two stroke sensors 210, 211 is larger than zero, it is determined that the brake pedal 10 is in operation.

If the brake pedal 10 is in operation while the vehicle is stationary, the control flow goes to sep S42 to determine whether a TIME ELAPSE flag is set at "1". This flag is set to "1" when step S45 has been implemented, and is reset to "0" in step S47 when a predetermined time has elapsed. When step S42 is implemented for the first time, a negative decision (NO) is obtained in this step, and the control flow goes to step S43 to determine the desired wheel brake cylinder pressure P. The actual wheel brake cylinder pressure is controlled by the linear valve devices 30, so as to coincide with the determined desired value P. The control of the linear valve devices 30 in this case is different from the control in the first control state described above, and is effected for the purpose of diagnosing the pressure sensors 210, 211. Accordingly, the desired wheel brake cylinder pressure P** is calculated according to the following equation (3), which is different from the equation (1).

$$P^{**}=(i\ P_M+P_B)/2 \quad (3)$$

The pressure $P_M$ and $P_B$ are the fluid pressures as detected by the master-cylinder and booster pressure sensors 210, 211.

Figure 11:
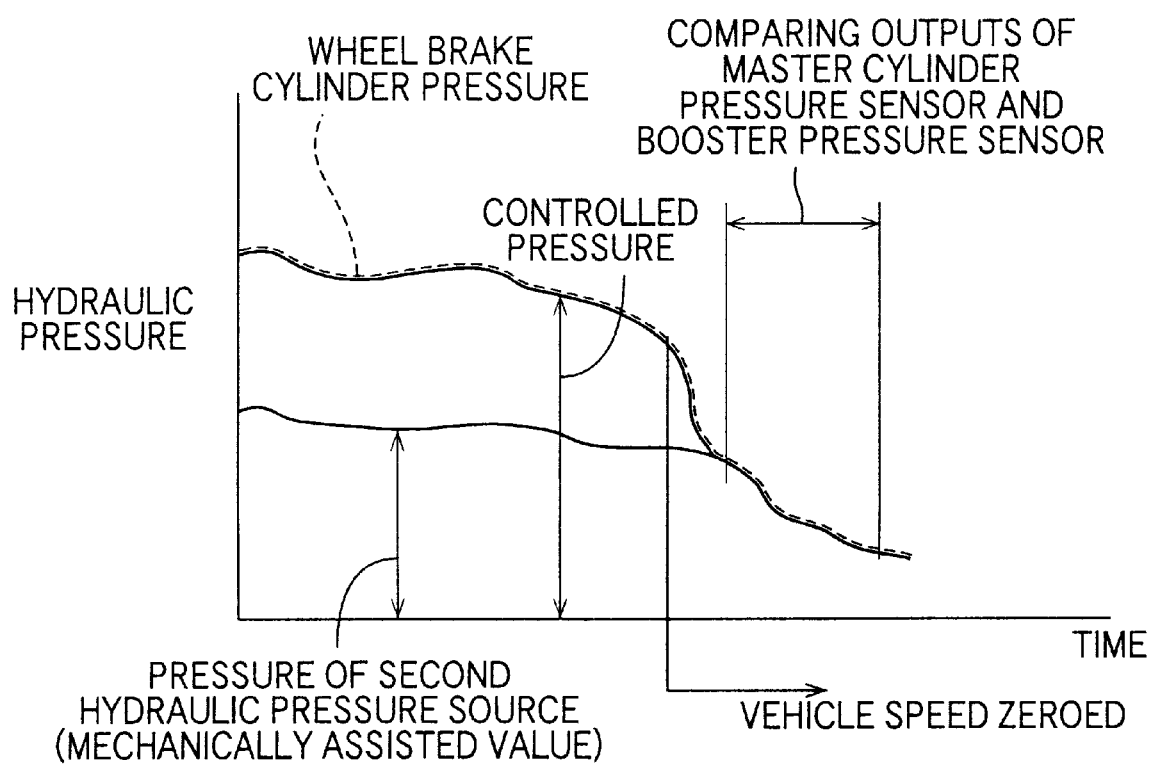
FIG. 11 is a view showing changes of wheel brake cylinder pressure upon detection of an abnormality of the braking system.

By controlling the actual wheel brake cylinder pressure so as to coincide with the desired value P determined according to the above equation (2), as indicated in FIG. 11, an influence of the opening actions of the master-cylinder shut-off valves 152, 162 on the operating state of the brake pedal 10** as felt by the vehicle operator can be reduced.

Step S43 is followed by step S44 to determine whether the absolute value of a difference between the actual value $P_{WC}$ and the desired value P** of the wheel brake cylinder pressure is equal to or smaller than a predetermined threshold ΔP*. If an affirmative decision (YES) is obtained in step S44, the control flow goes to step S45 to de-energize the coils 188 of the linear valve devices 30, so that the pressure-increasing and pressure-reducing linear valves 162, 174 are closed. Further, the master-cylinder shut-off valves 152, 162 are opened, in step S45. As a result, the pressurized fluid delivered from the second hydraulic pressure source 14 is supplied to the wheel brake cylinders 20, 28.

Step S45 is followed by step S46 to determine whether the predetermined time has passed after the pressure-increasing and pressure-reducing linear valves 172, 176 have been placed in the closed state. If an affirmative decision (YES) is obtained in step S46, the control flow goes to step S47 to read in the output signals of the master-cylinder pressure sensor 210, booster pressure sensor 211 and the wheel brake cylinder pressure sensors 212–218. Then, the control flow goes to step S48 to determine whether the absolute value of a difference between an average of the pressure values as detected by the two pressure sensors 210, 211 and an average of the pressure values as detected by the four wheel brake cylinder sensors 212–218 is smaller than a predetermined threshold ΔP. If an affirmative decision (YES) is obtained in step S48, the control flow goes to step S49 to determine that the master-cylinder pressure sensor 210 and the booster pressure sensor 211 are normal. If a negative decision (NO) is obtained in step S48, the control flow goes to step 50 to determine that the pressure sensors 210, 211 are abnormal.

As described above, the braking pressure control apparatus according to the present embodiment of the invention is arranged to diagnose the second hydraulic pressure source 14 at an increased number of opportunities. Conventionally, the sensors are usually diagnosed only upon initial checking of the vehicle prior to an operation of the braking system. On the other hand, the diagnosing device included in the braking pressure control apparatus of the present braking system is arranged to diagnose the pressure sensors 210, 211 during an operation of the brake pedal 10, so that the number of opportunities at which the second hydraulic pressure source 14 is diagnosed is accordingly increased.

Further, the fluid pressure in the wheel brake cylinders 20, 28 has been controlled to the desired value P before step S45 is implemented. Accordingly, the fluid pressure in the wheel brake cylinders 20, 28 can be rapidly made equal to the pressure of the second hydraulic pressure source 14 when the master-cylinder shut-off valves 152, 162 are opened. Thus, the predetermined time measured in step S46 can be reduced, making possible to reduce the time required for diagnosing the second hydraulic pressure source 14**.

However, controlling the actual wheel brake cylinder pressure to the desired value P before opening the master-cylinder shut-off valves 152, 162 is not essential. The master-cylinder shut-off valves 152, 162 may be opened provided 20 the wheel brake cylinder pressure is equal to the pressure of the second hydraulic pressure source 14**.

Further, the operation of controlling the actual wheel brake cylinder pressure to the desired value P is not essential in the diagnosis of FIG. 10, provided the determination in step S48 is effected after the pressure-increasing and pressure-reducing linear valves 172, 176 have been closed and the master-cylinder shut-off valves 152, 162 have been opened. In this case, too, the diagnosis can be effected on the basis of the wheel brake cylinder pressure and the pressure of the second hydraulic pressure source 14**.

Figure 12:
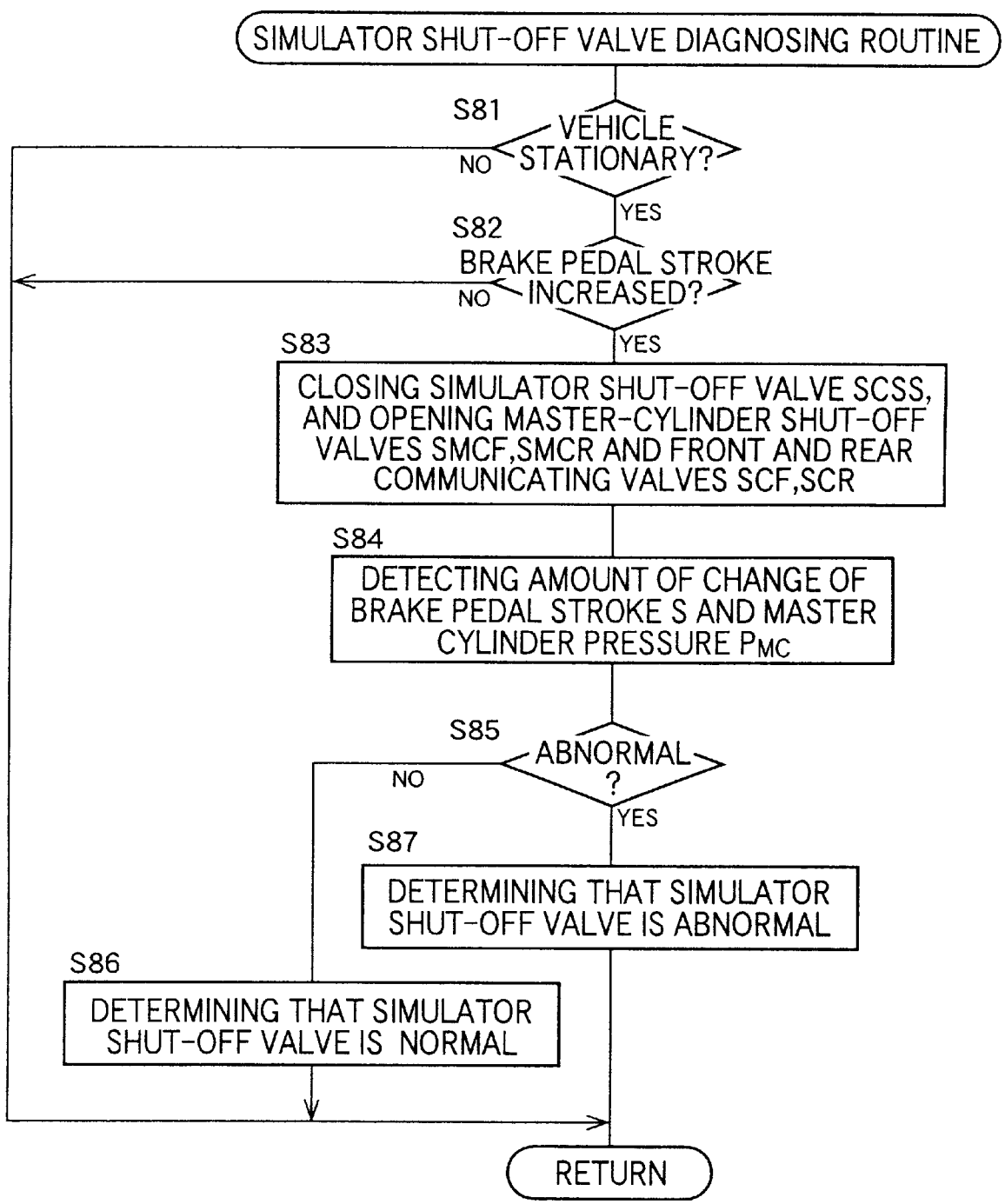
FIG. 12 is a flow chart illustrating a simulator shut-off valve abnormality detecting routine executed according to a control program stored in the ROM of the braking pressure control apparatus.

In the present embodiment, the simulator shut-off valve 158 is diagnosed according to a simulator shut-off valve diagnosing routine illustrated in the flow chart of FIG. 12.

Figure 13:
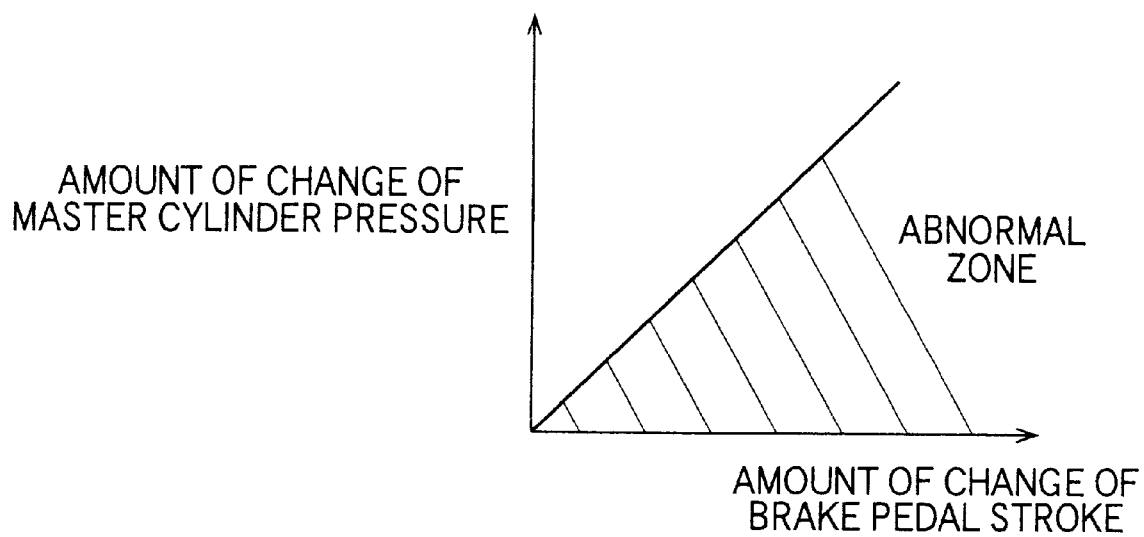
FIG. 13 is a graph indicating an abnormality detecting relationship represented by a data table stored in the ROM.

The simulator shut-off valve diagnosing routine is executed when the operating stroke of the brake pedal 10 is increased while the vehicle is stationary. The simulator shut-off valve 158 is diagnosed to be abnormal, if the amount of change (increase) of the operating stroke of the brake pedal 10 and the amount of change of the fluid pressure in the pressurizing chamber 86 (master cylinder pressure $P_M$) do not have a normal relationship, upon generation of a command to close the simulator shut-off valve 158. If the shut-off valve 158 cannot be closed and is held in the open state even after the command to close3 the shut-off valve 158 is generated (even after the solenoid coil of the shut-off valve 158 is de-energized),. the amount of change of the master cylinder pressure $P_M$ is smaller than that of the brake operating stroke. In the present embodiment, the ROM 244 stores a data table representing the predetermined relationship between the amounts of change of the brake operating member and the master cylinder pressure, as indicated in the graph of FIG. 13. The determination as to whether the simulator shut-off valve 158 is abnormal or not is effected by determining whether a point defined by the detected two amounts of change is located on one side of the straight line representing the relationship, or on the other side. When the simulator shut-off valve 154 is diagnosed to be abnormal (kept in the open state), the alarming device 252 is activated. The control of the braking system in the first control mode is possible even with the simulator shut-off valve 158 kept in the open state, as long as the pump device 12 is normally functioning. However, the brake operating stroke would be excessively increased if the control mode is switched from the first mode to the second mode. In this respect, it is not desirable to continue the control of the braking system in the first control state. Further, the diagnosing routine may be formulated to inhibit a running of the vehicle if the simulator shut-off valve 158 is abnormally kept in its open state and if the pressure of the accumulator 134 is lower than a predetermined lower limit.

Although the simulator shut-off valve diagnosing routine of FIG. 12 is formulated to diagnose the simulator shut-off valve 158 while the vehicle is stationary, this routine may be executed only upon initial checking of the vehicle. For instance, the vehicle operator is prompted to operate the brake pedal 10 or increase the operating stroke when the ignition switch of the vehicle is turned on while the vehicle is stationary. This arrangement assures a diagnosis of the simulator shut-off valve 158 upon initial checking of the vehicle.

The simulator shut-off valve diagnosing routine of FIG. 12 is initiated with step S81 to determine whether the vehicle is stationary. If an affirmative decision (YES) is obtained in step S81, the control flow goes to step S82 to determine whether the operating amount of the brake pedal 10 is increased. If an affirmative decision (YES) is obtained in step S82, the control flow goes to step S83 to command the simulator shut-off valve 158 to be closed, and command the master-cylinder shut-off valves 152, 162 and the front and rear communicating valves 154, 164 to be opened, so that the pressurized fluid delivered from the second hydraulic pressure source 14 is supplied to the four wheel brake cylinders 20, 28. Step S83 is followed by step S84 to detect the amount of change of the brake operating stroke S and the 40 amount of change of the master cylinder pressure $P_M$. Step S84 is followed by step S85 to determine whether the point defined by the detected amounts of change indicated above is located in an abnormal area on one side of the straight line representing the predetermined relationship of FIG. 13. If the point is not located in the abnormal zone, a negative decision (NO) is obtained in step S84, and the control flow goes to step S86 to determine whether the simulator shut-off valve normal. If the point is located in the abnormal zone, an affirmative decision (YES) is obtained in step S85, and the control flow goes to step S87 to determine that the simulator shut-off valve 158 is abnormal.

As described above, the present embodiment is arranged to diagnose the simulator shut-off valve 158, so that it is possible to inform the vehicle operator of an abnormality of the simulator shut-off valve 158 if detected.

To diagnose the simulator shut-off valve 158 with an improved degree of accuracy, it is desirable to obtain the ideal relationship between the amount of change of the brake operating stroke and the amount of change of the master cylinder pressure, on the basis of data obtained experimentation, and store the obtained ideal relationship in the ROM 244.

The arrangement to diagnose the simulator shut-off valve 158 can be utilized to diagnose the wheel brake cylinders 20, 28 for the presence of air contained therein. That is, in the presence of air in the wheel brake cylinders 20, 28, the amount of change of the master cylinder pressure tends to be comparatively small with respect to the amount of change of the brake operating stroke. In this case, however, it is required to determine whether the comparatively small amount of change of the master cylinder pressure is caused due to a defect of the simulator shut-off valve 158 (e.g., its valve member being kept in the open state due to its sticking) or due to the presence of air in the wheel brake cylinders 20, 28. This determination may be made by effecting another diagnosis according to the diagnosing routine of FIG. 12 while the master-cylinder shut-off valve 152 is held in the closed state. The presence of air in the wheel brake cylinders 20, 28 can be detected if the relationship between the amounts of change of the brake operating stroke and the master cylinder pressure is normal while the master-cylinder shut-off valve 152 is in the closed state, but is abnormal while the shut-off valve 152 is in the open state.

Similarly, the wheel brake cylinders 20, 28 can be diagnosed for the presence of air therein, on the basis of a relationship between the detected amounts of change of the brake operating stroke and the master cylinder pressure while the front and rear communicating valves 154, 164 are held in the open state, and that while the valves 154, 164 are held in the closed state.

Further, the simulator shut-off valve 158 can be diagnosed for an abnormality, on the basis of the above-indicated relationship while the front and rear communicating valves 154, 164 are held in the closed state. In this closed state, the amount of the pressurized fluid to be delivered from the second hydraulic pressure source 14 to the wheel brake cylinders 20, 28 is reduced, and the amount of change of the brake operating stroke is accordingly reduced, so that the determination as to whether the simulator shut-off valve 158 is in the closed state or not can be effected with improved accuracy. In addition, an influence of the diagnosis on the brake pedal 10 as felt by the vehicle operator can be reduced. In this respect, it is noted that the relationship between the amounts of change of the brake operating stroke and the master cylinder pressure when the simulator shut-off valve 158 is in the open state to diagnose the shut-off valve 158 with the front and rear communicating valves 154, 164 are held in the closed state is substantially the same as the relationship when the braking system is placed in the first control state in which the simulator shut-off valve 158 is in the open state with the master-cylinder shut-off valve 152 is held in the closed state.

Further, the simulator shut-off valve 158 can be diagnosed by first holding the master-cylinder shut-off valve 152 in the closed state and the simulator shut-off valve 158 in the open state, as in the normal control of the braking system in the first control state during an increase of the brake operating stroke, and then closing the simulator shut-off valve 158 while holding the master-cylinder shut-off valve 152 in the closed state when the brake operating stroke is reduced. If the master cylinder pressure is rapidly lowered during a reduction of the brake operating stroke, it means that the simulator shut-off valve 158 is in the closed state. If the master cylinder pressure is gradually lowered, it means that the simulator shut-off valve 158 is in the open state.

It will be understood from the foregoing description of the present embodiment that the various sensors indicated above and a portion of the ECU 32 assigned to store and execute the diagnosing routines of FIGS. 10 and 12 constitute a diagnosing device for diagnosing the second hydraulic pressure source 14.

It will also be understood that a portion of the diagnosing device assigned to store and execute the diagnosing routine of FIG. 10 constitutes a major part of a sensor diagnosing portion for diagnosing the pressure sensors 210, 211, while a portion of the diagnosing device assigned to store and execute the diagnosing routine of FIG. 12 constitutes a major part of a simulator diagnosing portion for diagnosing the stroke simulator 159.

It will further be understood that a portion of the ECU 32 assigned to store and execute the braking pressure control routine of FIG. 3 constitutes a major part of a first braking pressure control device operable while the braking system is normal. The braking pressure control device includes a control portion for controlling the wheel brake cylinder pressure to a value corresponding to the master cylinder pressure. It will also be understood that a portion of the ECU 32 assigned to store and the data table of FIG. 7 and control the braking system according to this data table constitutes a major part of a second braking pressure control device operable while the second hydraulic pressure source is abnormal, and that a portion of the ECU 32 assigned to switch the control mode of the braking system from the first control mode to the second control mode upon detection of an abnormality of the braking system according to the data table of FIG. 7 constitutes a major part of a switching device for switching the control mode between the first and second control modes.

In the above embodiment, the second hydraulic pressure source 14 is diagnosed for any abnormality according to the data table of FIG. 8. This diagnosis may be effected according to a diagnosing routine illustrated in the flow chart of FIG. 14, according to a second embodiment of this invention.

Figure 14:
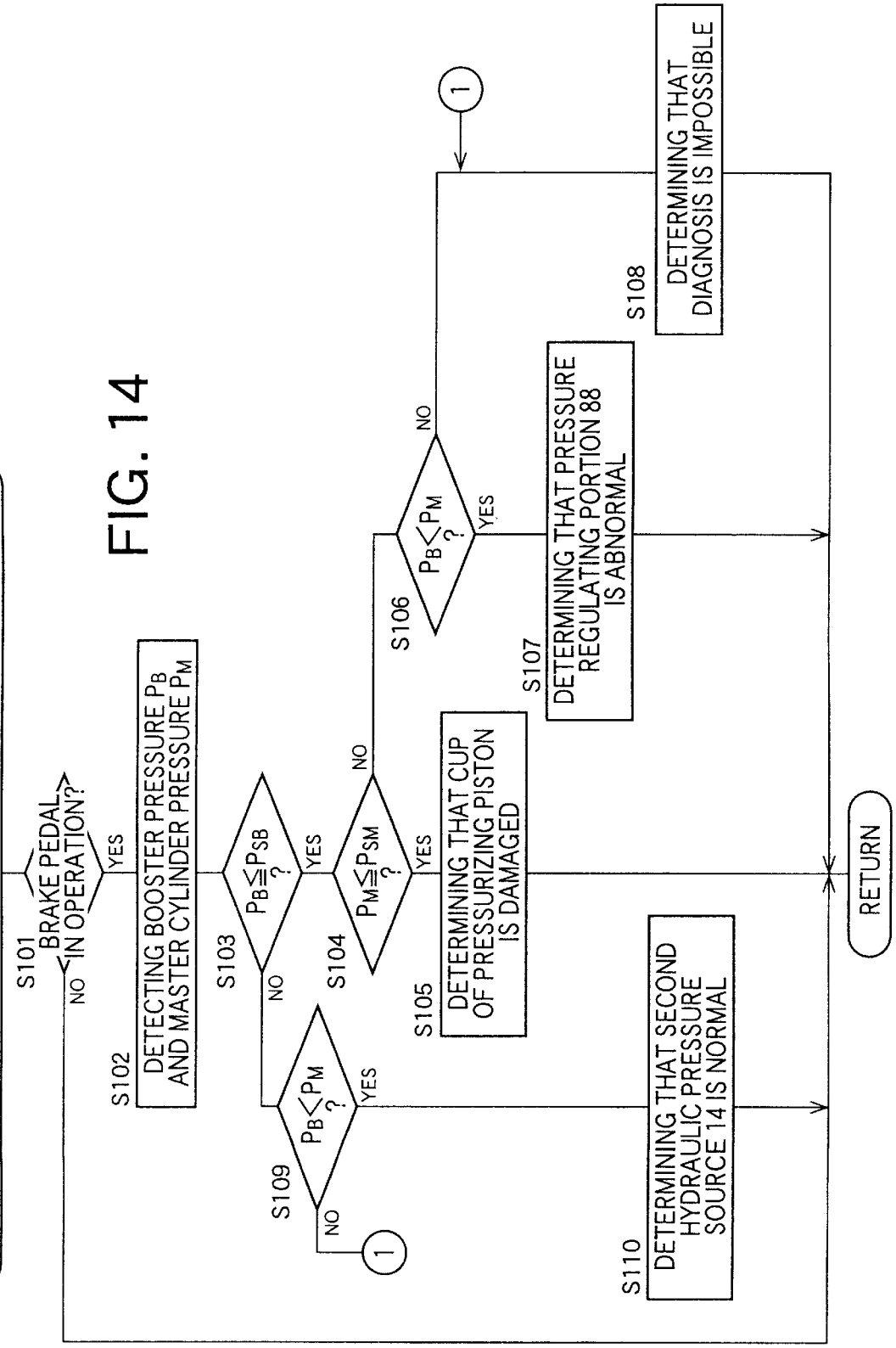
FIG. 14 is a flow chart illustrating a routine for detecting an abnormality of the second hydraulic system according to a control program stored in the ROM of a braking pressure control apparatus according to another embodiment of this invention.

The diagnosing routine of FIG. 14 is initiated with step S101 to determine whether the brake pedal 10 is in operation. If an affirmative decision (YES) is obtained in step S101, the control flow goes to step S102 to read in the master cylinder pressure $P_M$ and the booster pressure $P_B$ on the basis of the output signals of the master-cylinder pressure sensor 210 and the booster pressure sensor 211. Step S102 is followed by step S103 to determine whether the booster pressure $P_B$ is equal to or lower than a predetermined threshold $P_{SB}$ (which is almost zero, in this embodiment). If an affirmative decision (YES) is obtained in step S103, it means that the second hydraulic pressure source 14 is abnormal. The fluid pressure in the booster chamber 98 is not pressurized directly by a depressing action of the brake pedal 10. Therefore, the booster pressure lower than the threshold indicates a defect of the second hydraulic pressure source 14. Although it is not clear in this state whether the hydraulic booster 78 is abnormal, it is at least evident that the pressure regulating portion 88 is not able to generate a fluid pressure corresponding to the brake operating force. On the other hand, the master cylinder pressure (fluid pressure in the pressurizing chamber 86) is increased directly by the depressing operation of the brake pedal 10, so that the generated master cylinder pressure corresponds to the brake operating force, even when the hydraulic booster 78 is defective. Accordingly, the second hydraulic pressure source 14 is desirably diagnosed on the basis of the booster pressure as detected by the booster pressure sensor 211.

Although the second hydraulic pressure source 14 can be diagnosed on the basis of the booster pressure, a further diagnosis of the second hydraulic pressure source 14 is implemented in step S104 and subsequent steps, after the second hydraulic pressure source 14 has been diagnosed to be abnormal, on the basis of the booster pressure lower than the threshold.

Step S104 is provided to determine whether the master cylinder pressure $P_M$ as detected by the master-cylinder pressure sensor 210 is equal-to or higher than a predetermined threshold $P_{SM}$. If the master cylinder pressure is equal to or lower than the threshold, namely, if an affirmative decision (YES) is obtained in step S104, the control flow goes to step S105 to determine that the cup of the pressurizing piston 84 is damaged. If a negative decision (NO) is obtained in step S104, it means that the master cylinder pressure is normal. In this case, the control flow goes to step S106 to determine whether the master cylinder pressure is higher than the booster pressure. If the master cylinder pressure is higher than the booster pressure, the control flow goes to step S107 to determine that the pressure regulating portion 88 is abnormal, and bring the braking system into the abnormal-pressure-regulating-portion mode, so that the fluid pressure in the pressurizing chamber 86 can be pressurized to a value corresponding to the operating force of the brake pedal 10 in operation, even when the fluid pressure in the booster chamber 98 cannot be pressurized. If the master cylinder pressure lower than the booster pressure, the control flow goes to step S108 to determine that it is impossible to identify an abnormality of the second hydraulic pressure source 14, and bring the braking system into the impossible-to-diagnose mode described above.

If the booster pressure is higher than the predetermined threshold, that is, if a negative decision (NO) is obtained in step S103, the control flow goes to step S109 to determine whether the master cylinder pressure is higher than the booster pressure. If an affirmative decision (YES) is obtained in step S109, the control flow goes to step S110 to determine that the second hydraulic pressure source 14 is normal. If a negative decision (NO) is obtained in step S109, the control flow goes to step S108 to bring the braking system into the impossible-to-diagnose mode.

As described above, the second hydraulic pressure source 14 is diagnosed to be abnormal if the booster pressure is lower than the threshold. Thus, the second hydraulic pressure source 14 can be easily diagnosed.

Figure 15:
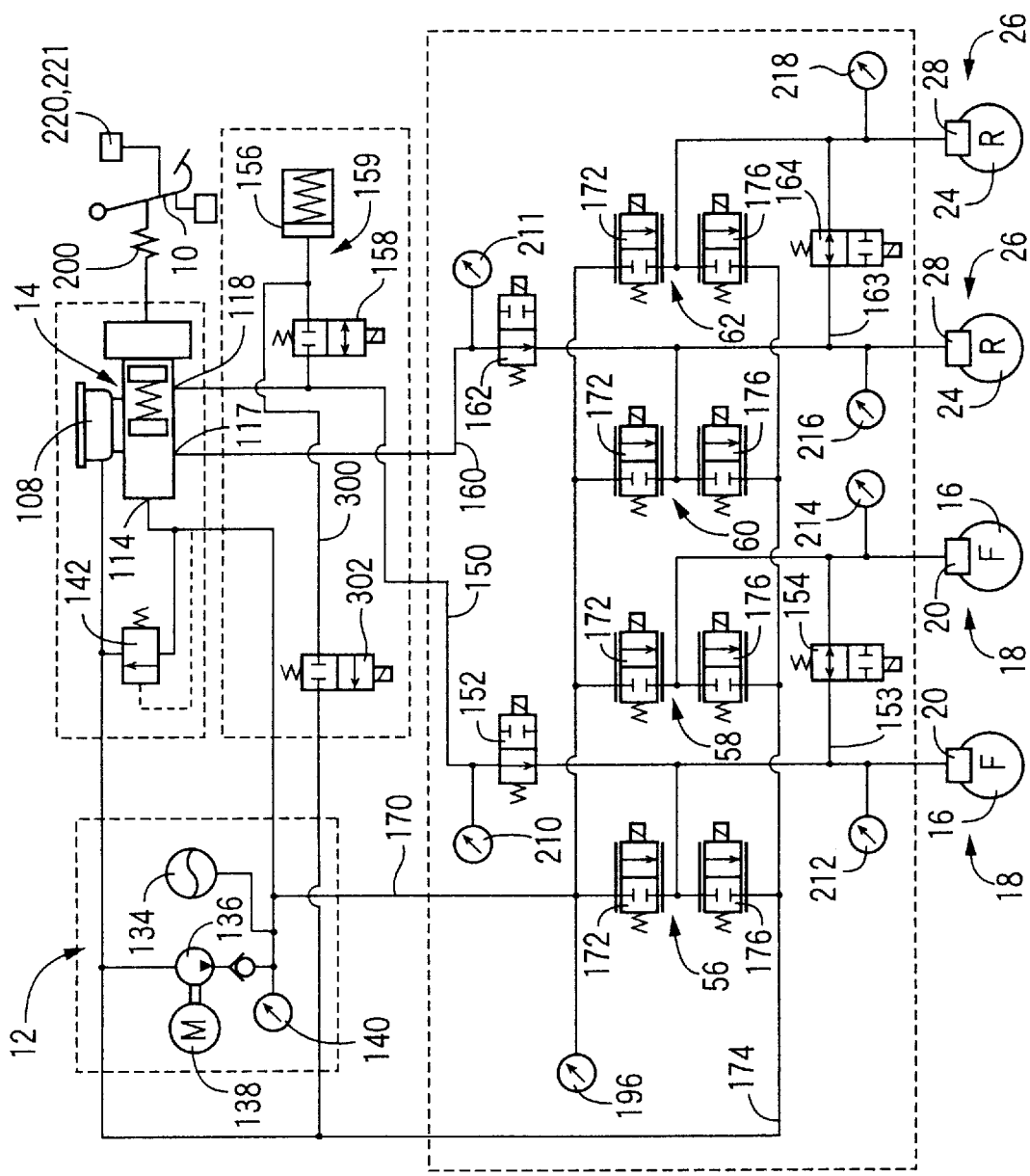
FIG. 15 is a schematic view showing another braking system according to a further embodiment of the invention, which includes the braking pressure control apparatus of FIG. 1.

The principle of the present invention is applicable to a braking system constructed as shown in FIG. 15, as well as the braking system of FIG. 1. In the embodiment of FIG. 15, a releasing passage 300 is provided to connect the master reservoir 108 to a fluid passage connecting the simulator shut-off valve 158 and the stroke simulator 156 of the stroke simulator device 159. A releasing valve 302 is provided in the releasing passage 300. This shut-off valve 302 has an open position for fluid communication of the stroke simulator 156 to the master reservoir 108, and a closed position for inhibiting the fluid communication between the stroke simulator 156 and the master reservoir 108. The releasing valve 302 permits accurate diagnosis of the simulator shut-off valve 158 as to whether it is kept in its open state due to sticking of the valve member.

In the third embodiment of FIG. 15, the simulator shut-off valve 158 is diagnosed as to whether it is placed in the closed state, as in the first embodiment. However, the diagnosis in the present embodiment is effected while the shut-off valve 302 is held in the open state. The amounts of change of the brake operating stroke and the master cylinder pressure are detected when the simulator shut-off valve 158 is commanded to be closed. If the simulator shut-off valve 158 is kept in the open state, the pressurized fluid is discharged from the pressurizing chamber 86 into the master reservoir 108 through the connecting passage 300 when the brake pedal 10 is operated. Accordingly, the brake operating stroke is rapidly increased, and the amount of change of the master cylinder pressure is comparatively small with respect to the amount of change of the brake operating stroke. Thus, the simulator shut-off valve 158 can be diagnosed with high accuracy while the shut-off valve 302 is placed in the open state.

Figure 16:
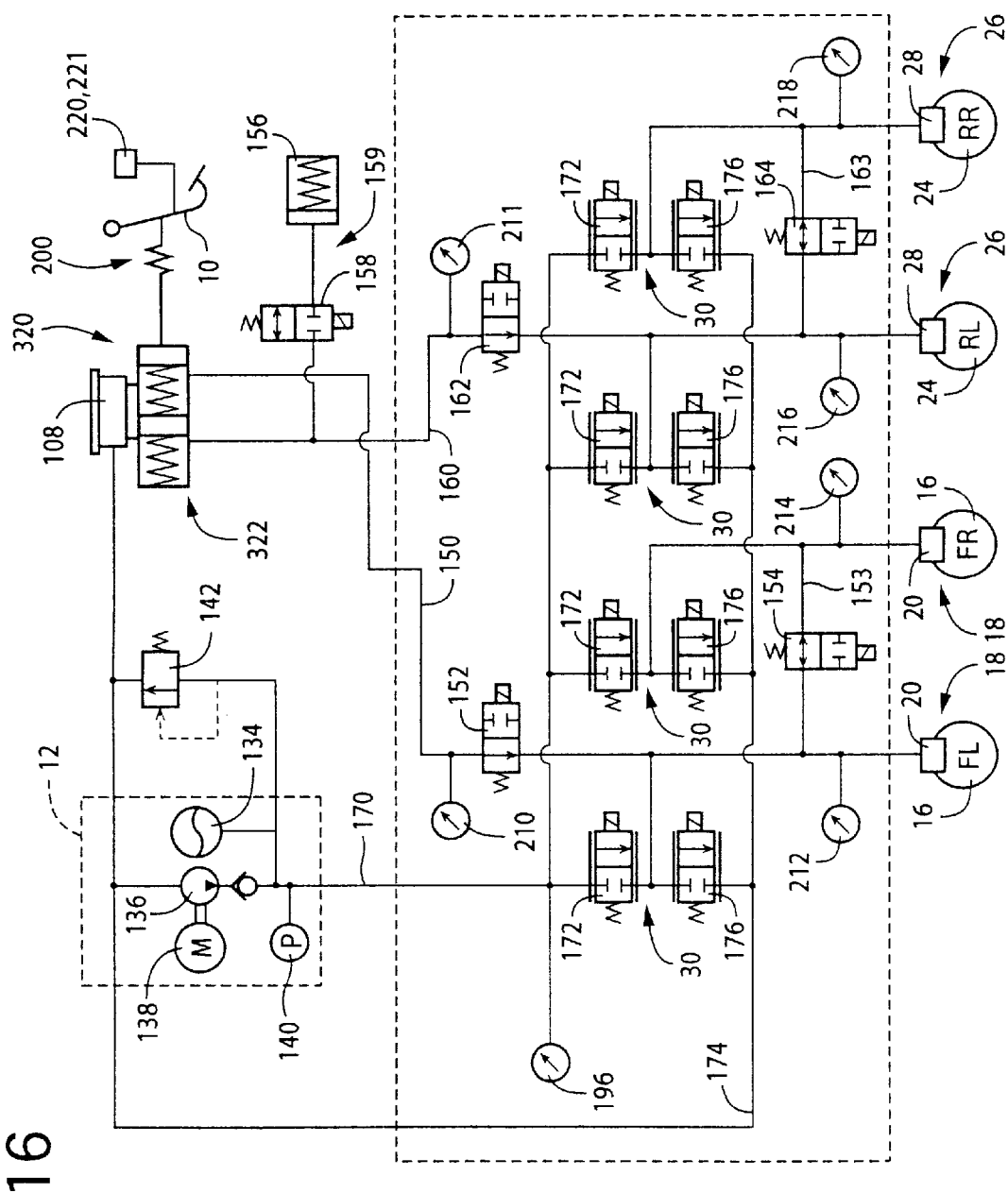
FIG. 16 is a schematic view showing a further braking system according to a still further embodiment of the invention, which includes the braking pressure control apparatus of FIG. 1.

In the illustrated embodiments described above, the second hydraulic pressure source 14 includes the hydraulic booster 78. However, the second hydraulic pressure source 14 may include a pressure-increasing device adapted to permit the pressure source 14 to generate a fluid pressure higher than a value corresponding to the brake operating force. Further, the second hydraulic pressure source 14 may not include the hydraulic booster 78 and a pressure-increasing device as indicated above. An example of a braking system incorporating this modification is shown in FIG. 16. Namely, the braking system according to the fourth embodiment of FIG. 16 include a second hydraulic pressure source 320, which includes a master cylinder 322 but does not include a hydraulic booster or a pressure-increasing device. In this braking system, too, it is effective to diagnose the stroke simulator 159 and the various sensors. Further, the second hydraulic pressure source may include a vacuum booster. It is also noted that the stroke simulator may be provided in a fluid passage connected to the fluid passage 160 for the rear wheel brake cylinders 28, rather than the fluid passage 150 for the front wheel brake cylinders 20. Alternatively, the stroke simulator may be connected directly to the pressurizing chamber 86 of the master cylinder 80. The hydraulic pressure sensor 140 may be replaced by a pressure switch.

While the stroke simulator 200 is provided as part of the operating rod 94 in the illustrated embodiments, this stroke simulator 200 is not essential, provided the stroke simulator 156 is provided.

Although the four linear valve devices 30 are provided for the respective four wheel brake cylinders 20, 28, the use of the four linear valve devices 30 is not essential. For instance, one linear valve device 30 may be provided for all of the four wheel brake cylinders, or each of the two pairs of the wheel brake cylinders 20, 28. Further, the pressure-increasing and pressure-reducing linear valves 172, 176 may be replaced by simple solenoid-operated shut-off valves. It is also noted that the linear valve devices 30 are not essential. In the absence of the linear valve devices 30, the wheel brake cylinder pressure can be controlled by controlling the pump device 12. The master-cylinder shut-off valves 152, 162 and other shut-off valves may be replaced by flow control valves capable of controlling a rate of fluid flow therethrough with a variable cross sectional area of fluid communication according to an electric current applied thereto.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking pressure control apparatus for a hydraulically operated brake, comprising:
    a first hydraulic system including a first hydraulic pressure source which is power-operated to pressurize a working fluid and capable of controlling a pressure of the pressurized fluid, for operating said brake with the pressurized fluid delivered from said first hydraulic pressure source;
    a second hydraulic system including a manually operable brake operating member, and a second hydraulic pressure source which is operable by an operating force acting on said brake operating member, to pressurize the working fluid to a pressure higher than a level corresponding to said operating force, for operating said brake with the pressurized fluid delivered from said second hydraulic pressure source;
    a switching device operable to selectively establish a first state in which said brake is operated with the pressurized fluid delivered from said first hydraulic pressure source, and a second state in which said brake is operated with the pressurized fluid delivered from said second hydraulic pressure source; and
    a diagnosing device operable to diagnose said second hydraulic system on the basis of a pressure of the fluid in said second hydraulic system.

2. A braking pressure control apparatus according to claim 1, wherein said diagnosing device diagnoses said second hydraulic system on the basis of the pressure of the fluid pressurized by said second hydraulic pressure source and a pressure of the fluid in said manually operable brake while said second state is established by said switching device.

3. A braking pressure control apparatus according to claim 2, wherein said diagnosing device includes a switching portion operable when said first state is established, to change said first state to said second state after the fluid pressure in said brake has been controlled in said first state to a level close to the fluid pressure in said second hydraulic pressure source.

4. A braking pressure control apparatus according to claim 2, wherein said second hydraulic system comprises:
    a first pressure sensing device for detecting the pressure of the fluid pressurized by said second hydraulic pressure source; and
    a second pressure sensing device for detecting the pressure of the fluid in said brake,
    and wherein said diagnosing device includes a sensor-diagnosing portion operable to diagnose at least one of said first and second pressure sensing devices, on the basis of the pressures detected by said first and second sensing devices.

5. A braking pressure control apparatus according to claim 4, further comprising:
    a first braking pressure control device operable while said first state is established by said switching device, to control the pressure of the fluid in said brake on the basis of the pressure of the fluid detected by said first pressure sensing device; and
    a second braking pressure control device operable when said sensor-diagnosing portion determines that said first pressure sensing device is abnormal while said first state is established by said switching device, said second braking pressure control device controlling the pressure of the fluid in said brake on the basis of an operating amount of said manually operable brake operating member.

6. A braking pressure control apparatus according to claim 1, wherein said second hydraulic system comprises:
    a hydraulic booster including a power piston which is operatively connected to said manually operable brake operating member and which partially defines a booster chamber on a rear side of said power piston as viewed in a direction of an advancing movement of said power piston when said brake operating member is operated, said booster chamber being arranged to receive a pressurized fluid whose pressure corresponds to the operating force of said brake operating member; and
    a booster pressure sensor for detecting the pressure of the pressurized fluid in said booster chamber,
    and wherein said diagnosing device diagnoses said second hydraulic system on the basis of the pressure of the pressurized fluid in said booster chamber detected by said booster pressure sensor.

7. A braking pressure control apparatus according to claim 6, wherein said second hydraulic system comprises:
    a master cylinder including a pressurizing piston which is operatively connected to said power piston and which partially so defines a pressurizing chamber on one of opposite sides thereof remote from said power piston; and a master-cylinder pressure sensor for detecting a pressure of the fluid in said pressurizing chamber, and wherein said diagnosing device diagnoses said second hydraulic system on the basis of the fluid pressure detected by said master-cylinder pressure sensor and the fluid pressure detected by said booster pressure sensor.

8. A braking pressure control apparatus according to claim 7, wherein said diagnosing device determines that said master cylinder is normal while said hydraulic booster is abnormal, when the pressure of the fluid in said pressurizing chamber detected by said master-cylinder pressure sensor is not lower than a predetermined threshold, while the pressure of the fluid in said booster chamber detected by said booster pressure sensor is lower than a predetermined threshold.

9. A braking pressure control apparatus according to claim 7, wherein said hydraulic booster includes a pressure regulating portion which is connected to a high-pressure source capable of delivering a pressurized fluid whose pressure is higher than a maximum pressure of the fluid pressurized by said second hydraulic pressure source and which is operable to regulate the pressure of the pressurized fluid received from said high-pressure source to a level corresponding to the pressure of the fluid in said pressurizing chamber, said hydraulic booster having a fluid passage through which the pressurized fluid whose pressure has been regulated by said pressure regulating portion is supplied to said booster chamber, and wherein said diagnosing device determines that said master cylinder is abnormal, when the fluid pressure in said pressurizing chamber detected by said master-cylinder pressure sensor is lower than a predetermined threshold while the fluid pressure in said booster chamber detected by said booster pressure sensor is lower than a predetermined threshold.

10. A braking pressure control apparatus according to claim 6, further comprising:

a first braking pressure control device operable while said first state is established by said switching device, to control the pressure of the fluid in said brake on the basis of the pressure of the fluid detected by said first pressure sensing device; and a second braking pressure control device operable when said sensor-diagnosing portion determines that said first pressure sensing device is abnormal while said first state is established by said switching device, said second braking pressure control device controlling the pressure of the fluid in said brake on the basis of an operating amount of said manually operable brake operating member, and wherein said second hydraulic system comprises:

a master cylinder including a pressurizing piston which is operatively connected to said power piston and which partially defines a pressurizing chamber on one of opposite sides thereof remote from said power piston; and a master-cylinder pressure sensor for detecting a pressure of the fluid in said pressurizing chamber, and wherein said first braking pressure control device includes a portion operable to control the pressure of the fluid in said brake on the basis of the pressure of the fluid in said pressurizing chamber detected by said master-cylinder pressure sensor.

11. A braking pressure control apparatus according to claim 1, wherein said second hydraulic system comprises:

a pressure sensing device for detecting the pressure of the fluid pressurized by said second hydraulic pressure source; and an operating amount sensing device for detecting an operating amount of said manually operated brake operating member, and wherein said diagnosing device diagnoses said second hydraulic system on the basis of the pressure of the pressurized fluid detected by said pressure sensing device and the operating amount of said brake operating member detected by said operating amount sensing device.

12. A braking pressure control apparatus according to claim 11, wherein said second hydraulic system includes a plurality of brake cylinders for respective brakes, and fluid passages connecting said brake cylinders to said second hydraulic pressure source, said fluid passages including at least one main fluid passage connected to said second hydraulic pressure source, and at least one connecting passage, each of which is connected to one of said at least one main fluid passage and connects at least two of said plurality of brake cylinders to each other, said braking pressure control apparatus further comprising:

a communicating valve provided in at least one of said at least one connecting passage and is operable between an open state in which said at least two brake cylinders are held in communication with each other, and a closed state in which said at least two brake cylinders are disconnected from each other, and wherein said diagnosing device diagnoses said at least two brake cylinders for the presence of air contained therein, on the basis of amounts of change of said operating stroke of said brake operating member and the pressure of the fluid pressurized by said second hydraulic pressure source while said communicating valve is placed in said open state and those while said communicating valve is placed in said closed state.

13. A braking pressure control apparatus according to claim 1, wherein said second hydraulic system includes a high-pressure source capable of delivering a pressurized fluid whose pressure is higher than a maximum pressure of the fluid pressurized by said second hydraulic pressure source, and wherein said diagnosing device diagnoses said second hydraulic system on the basis of the pressure of the pressurized fluid of said high-pressure source as well as the pressure of the fluid pressurized by said second hydraulic pressure source.

14. A braking pressure control apparatus according to claim 1, further comprising a controller for controlling said switch to selectively establish said first and second states, depending upon a result of a diagnosis by said diagnosing device.

15. A braking pressure control apparatus according to claim 1, further comprising:

a first braking pressure control device operable while no abnormality is detected by said diagnosing device, for controlling the fluid pressure in said brake in a predetermined normal manner;

a plurality of sensors; and a second braking pressure control device operable while an abnormality of at least one of said sensors is detected by said diagnosing device, for controlling the fluid pressure in said brake in a manner different from said predetermined normal manner, without using an output of said at least one sensor.

16. A braking pressure control apparatus according to claim 15, further comprising a device for restricting an amount of change of at least one of an operating state of said brake operating member and the fluid pressure in said brake when the operating state of the apparatus is switched by said switching device between said first and second states.

17. A braking pressure control apparatus according to claim 15, further comprising a device for reducing a difference between the fluid pressure in said brake and the pressure of the fluid pressurized by said second hydraulic pressure source, when the operating state of the apparatus is switched by said switching device between said first and second states.

18. A braking pressure control apparatus according to claim further comprising a device for reducing an amount of flow of the fluid between said second hydraulic pressure source and said brake when the operating state of the apparatus is switched by said switching device between said first and second states.

19. A braking pressure control apparatus according to claim 1, further comprising a device for restricting an amount of change of at least one of an operating state of said brake operating member and the fluid pressure in said brake when the operating state of the apparatus is switched by said switching device between said first and second states.

20. A braking pressure control apparatus according to claim 1, further comprising a device for reducing a difference between the fluid pressure in said brake and the pressure of the fluid pressurized by said second hydraulic pressure source, when the operating state of the apparatus is switched by said switching device between said first and second states.

21. A braking pressure control apparatus according to claim 1, further comprising a device for reducing an amount of flow of the fluid between said second hydraulic pressure source and said brake when the operating state of the apparatus is switched by said switching device between said first and second states.

22. A braking pressure control apparatus for a hydraulically operated brake including a brake cylinder, comprising:
   a first hydraulic system including a first hydraulic pressure source which is power-operated to pressurize a working fluid and capable of controlling a pressure of the pressurized fluid to be delivered to said brake cylinder for operating said brake with the pressurized fluid delivered from said first hydraulic pressure source;
   a second hydraulic system including a manually operable brake operating member, and a second hydraulic pressure source which is operable by an operating force acting on said brake operating member, to pressurize the working fluid to a pressure corresponding to said operating force, so that the fluid pressurized by said second hydraulic pressure source is delivered to said brake cylinder for operating said brake;
   a switching device operable to selectively establish a first state in which said brake cylinder is supplied with the pressurized fluid delivered from said first hydraulic pressure source, and a second state in which said brake is supplied with the pressurized fluid delivered from said second hydraulic pressure source;
   a stroke simulator device including a stroke simulator connected to said second hydraulic pressure source, and a simulator shut-off valve having a closed state in which said stroke simulator is disconnected from said second hydraulic pressure source, and an open state in which said stroke simulator is in communication with said second hydraulic pressure source: and
   a diagnosing device operable to diagnose said stroke simulator device on the basis of an amount of change of an operating stroke of said brake operating member and an amount of change of the pressure of the fluid pressurized by said second hydraulic pressure source.

23. A braking pressure control apparatus according to claim 22, wherein said diagnosing device diagnoses said stroke simulator device while said second state is established by said switching device.

24. A braking pressure control apparatus according to claim 23, wherein said second hydraulic system includes a plurality of brake cylinders for respective brakes, and fluid passages connecting said brake cylinders to said second hydraulic pressure source, said fluid passages including at least one main fluid passage connected to said second hydraulic pressure source, and at least one connecting passage each of which is connected to said main fluid passage and connects at least two of said plurality of brake cylinders to each other, said braking pressure control apparatus further comprising:
   a communicating valve provided in at least one of said at least one connecting passage and is operable between an open state in which said at least two brake cylinders are held in communication with each other, and a closed state in which said at least two brake cylinders are disconnected from each other,
   and wherein said diagnosing device diagnoses said stroke simulator device while said communicating valve is placed in said closed state.

25. A braking pressure control apparatus according to claim 22, wherein said diagnosing device has a releasing passage connected at one end thereof to a low-pressure source and at the other end thereof to a portion of said stroke simulator device which is between said simulator shut-off valve and said stroke simulator, said diagnosing device including a releasing valve provided in said releasing passage and having an open state in which said stroke simulator device is communicated at said portion thereof to said low-pressure source, and a closed state in which said stroke simulator device is disconnected at said portion thereof from said low-pressure source,
   and wherein said diagnosing device diagnoses said stroke simulator device on the basis of the amount of change of the operating stroke of said brake operating member and the pressure of the fluid pressurized by said second hydraulic pressure source while said releasing valve is placed in said open state.

26. A braking pressure control apparatus according to claim 22, further comprising an alarming device operable to provide an alarm when said diagnosing device has determined that said stroke simulator device is abnormal.

27. A braking pressure control apparatus according to claim 22, further comprising a controller for controlling said switch to selectively establish said first and second states, depending upon a result of a diagnosis by said diagnosing device.

28. A braking pressure control apparatus according to claim 22, further comprising:
   a first braking pressure control device operable while no abnormality is detected by said diagnosing device, for controlling the fluid pressure in said brake in a predetermined normal manner;
   a plurality of sensors; and a second braking pressure control device operable while an abnormality of at least one of said sensors is detected by said diagnosing device, for controlling the fluid pressure in said brake in a manner different from said predetermined normal manner, without using an output of said at least one sensor.

29. A braking pressure control apparatus according to claim 22, further comprising a device for restricting an amount of change of at least one of an operating state of said brake operating member and the fluid pressure in said brake when the operating state of the apparatus is switched by said switching device between said first and second states.

30. A braking pressure control apparatus according to claim 22, further comprising a device for reducing a difference between the fluid pressure in said brake and the pressure of the fluid pressurized by said second hydraulic pressure source, when the operating state of the apparatus is switched by said switching device between said first and second states.

31. A braking pressure control apparatus according to claim 22, further comprising a device for reducing an amount of flow of the fluid between said second hydraulic pressure source and said brake when the operating state of the apparatus is switched by said switching device between said first and second states.

32. A braking pressure control apparatus for a hydraulically operated brake, characterized by comprising:

a first hydraulic system including a first hydraulic pressure source which is power-operated to pressurize a working fluid and capable of controlling a pressure of the pressurized fluid, for operating said brake with the pressurized fluid delivered from said first hydraulic pressure source;

a second hydraulic system including a manually operable brake operating member, and a second hydraulic pressure source which is operable by an operating force acting on said brake operating member, to pressurize the working fluid to a pressure higher than a level corresponding to said operating force, for operating said brake with the pressurized fluid delivered from said second hydraulic pressure source;

a switching device operable to selectively establish a first state in which said brake is operated with the pressurized fluid delivered from said first hydraulic pressure source, and a second state in which said brake is operated with the pressurized fluid delivered from said second hydraulic pressure source; and a diagnosing device operable to diagnose said second hydraulic system on the basis of an operating state of said second hydraulic system.

* * * * *